US012025984B2

United States Patent
Biswas et al.

(10) Patent No.: US 12,025,984 B2
(45) Date of Patent: Jul. 2, 2024

(54) IMPERFECT SENSING BASED ANALYSIS OF AGENTS DEPLOYED IN ENVIRONMENTS FOR TRAVERSAL TASK EXECUTION

(71) Applicant: Tata Consultancy Services Limited, Mumbai (IN)

(72) Inventors: Swagata Biswas, Kolkata (IN); Himadri Sekhar Paul, Kolkata (IN); Saurabh Bagchi, West Lafayette, IN (US)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 146 days.

(21) Appl. No.: 17/365,937

(22) Filed: Jul. 1, 2021

(65) Prior Publication Data
US 2022/0187833 A1     Jun. 16, 2022

(51) Int. Cl.
*G05D 1/00*     (2006.01)
*B60W 50/02*     (2012.01)
(Continued)

(52) U.S. Cl.
CPC ....... *G05D 1/0214* (2013.01); *B60W 50/0205* (2013.01); *B60W 50/029* (2013.01);
(Continued)

(58) Field of Classification Search
CPC .............. G05D 1/0214; G05D 1/0088; B60W 50/0205; B60W 50/029; B60W 60/001; B60W 2050/0215; G06F 9/4881
See application file for complete search history.

(56) References Cited

U.S. PATENT DOCUMENTS 10,338,594 B2    7/2019  Long
2018/0210083 A1*  7/2018  Fasching ................. G01S 17/89
(Continued)

OTHER PUBLICATIONS

Bhattacharjya, Shuvodeep, "Effect of sensor errors on autonomous steering control and application of sensor fusion for robust navigation", Dissertations, Master's Theses and Master's Reports, Jan. 2019, Scielo.br, https://digitalcommons.mtu.edu/cgi/viewcontent.cgi?article=1929&context=etdr.
(Continued)

*Primary Examiner* — Jelani A Smith
*Assistant Examiner* — Nada Mahyoob Alqaderi
(74) *Attorney, Agent, or Firm* — FINNEGAN, HENDERSON, FARABOW, GARRETT & DUNNER, LLP

(57) ABSTRACT

A fully tested autonomous system works predictably under ideal or assumed environment. However, behavior of the system is not fully defined when component(s) malfunction or fail (e.g., sensor failures) and the like which leads to inefficient task execution. Present disclosure provides system and method for imperfect sensing-based analysis of agents deployed in environments for traversal task execution, specifically, in unknown environments. The system estimates performance metric (e.g., task execution time) and safety metrics (e.g., number of collisions encountered while executing the task) related to task of traversal of the vehicle/agent from its current position to a target location. The system also incorporates sensitivity of each sensor(s), for given task, when they malfunction. The sensing malfunction can be both independent and/or co-related with malfunction of other sensors. Such a model helps to identify the most critical component in the agent(s), thereby increasing reliability of the system and meet safety standards.

12 Claims, 9 Drawing Sheets

(51) Int. Cl.
    *B60W 50/029*     (2012.01)
    *B60W 60/00*     (2020.01)
    *G06F 9/48*     (2006.01)

(52) U.S. Cl.
    CPC ......... *B60W 60/001* (2020.02); *G05D 1/0088* (2013.01); *G06F 9/4881* (2013.01); *B60W 2050/0215* (2013.01)

(56) References Cited

U.S. PATENT DOCUMENTS

| | | | |
|---|---|---|---|
| 2018/0314261 A1* | 11/2018 | Arandorenko | G05D 1/0088 |
| 2020/0079362 A1* | 3/2020 | Kingman | B60R 19/483 |
| 2020/0326703 A1* | 10/2020 | Li | G05D 1/0231 |
| 2021/0191393 A1* | 6/2021 | Zhu | G07C 5/02 |
| 2021/0284108 A1* | 9/2021 | Liu | B60T 7/22 |
| 2021/0397187 A1* | 12/2021 | Korjus | G06V 20/20 |

OTHER PUBLICATIONS

Ijeh, Ikenna Chinazaekpere, "A collision-avoidance system for an electric vehicle: a drive-by-wire technology initiative", Applied Science, Mar. 2020, Springer, https://link.springer.com/content/pdf/10.1007/s42452-020-2383-2.pdf.

\* cited by examiner

IMPERFECT SENSING BASED ANALYSIS OF AGENTS DEPLOYED IN ENVIRONMENTS FOR TRAVERSAL TASK EXECUTION

PRIORITY CLAIM

The present application claims priority to Indian application, Application No. 202021054749, filed in India on Dec. 16, 2020. The entire contents of the aforementioned application are incorporated herein by reference.

TECHNICAL FIELD

The disclosure herein generally relates to tasks execution, and, more particularly, to imperfect sensing-based analysis of agents deployed in environments for traversal task execution.

BACKGROUND

Autonomous systems are increasingly making its way deeper into industries like automobile, manufacturing, logistics, etc. However, automation raises many concerns and the major ones stem from safety and reliability of the system while maintaining acceptable performance. For example, one of the concerns is the throughput of the system, e.g., the number of orders a fulfillment center is able to complete within a given time-frame. But, from the safety perspective, it is important to estimate, as an example, probability of collision of robots or autonomous vehicles in the system. These concerns are, however, generic, and applicable across all domains.

Mobility is an essential task in most autonomous systems. Agents such as an autonomous ground vehicle (AGV) perform the basic task of traveling to a specific destination. The travel path is determined by some independent planner, given a floor-plan with known static obstacles in it. However, there may be temporary static obstacles on the planned path, unknown to the planner. For example, in a warehouse a box or a shelf may fall on the AGV's path. In such cases, the AGV's intrinsic obstacle avoidance procedure has to take appropriate action. Obstacle avoidance maneuver involves re-planning resulting in a longer path to travel. There could also be other instances, involving sensor failures during such task execution. It is therefore pertinent to estimate or predict effect on system performance under independent and correlated errors in sensors and identify the most critical components in any given system to increase the reliability of the system and also meet the safety objectives.

SUMMARY

Embodiments of the present disclosure present technological improvements as solutions to one or more of the above-mentioned technical problems recognized by the inventors in conventional systems. For example, in one aspect, there is provided a processor implemented method for imperfect sensing-based analysis of agents deployed in environments for traversal task execution. The method comprises obtaining in a first mode, via one or more hardware processors, an input comprising one or more specifications, wherein the one or more specifications correspond to one or more of (a) one or more agents, (b) one or more associated sensors, (c) one or more tasks to be performed by the one or more agents, (d) one or more sensor errors, (e) one or more zones, or (f) one or more environments; evaluating in the first mode, via the one or more hardware processors, a distance to be traversed by the one or more agents in the one or more environments; evaluating in the first mode, via the one or more hardware processors, a probability of failing to detect one or more obstacles by the one or more agents in a specific zone of the one or more zones based on the evaluated distance; evaluating in the first mode, via the one or more hardware processors, (i) an expected time taken to traverse, and (ii) an expected number of encounterable collisions during execution of the one or more tasks based on the probability of failing to detect one or more obstacles by the one or more agents; performing in the first mode, via the one or more hardware processors, a first comparison of (i) the evaluated expected time and a pre-defined expected time, (ii) the expected number of encounterable collisions and a pre-defined number of permissible collisions; and enabling on the first comparison, via the one or more hardware processors, deployment of the one or more agents in the one or more environments for execution of the one or more tasks based, wherein the one or more agents execute the one of more tasks in a second mode.

In an embodiment, the method further comprises evaluating sensitivity of each of the one or more associated sensors based on the first comparison; performing a second comparison of the evaluated sensitivity across the one or more associated sensors; and selecting at least a subset of sensors from the one or more associated sensors based on the second comparison.

In an embodiment, the method further comprises updating one or more corresponding specifications from the one or more specifications based on the selected subset of sensors.

In an embodiment, the one or more corresponding specifications correspond to the one or more sensors and the one or more sensor errors.

In an embodiment, the method further comprises upon updating the one or more corresponding specifications, repeating the step of evaluating in the first mode, via the one or more hardware processors, a probability of failing to detect one or more obstacles by the one or more agents in a specific zone of the one or more zones.

In an embodiment, the method further comprises continually evaluating in the second mode, during task execution by the one or more agents, via the one or more hardware processors, at least one of (i) remaining distance to be traversed, (ii) remaining expected time taken to traverse, and (iii) remaining expected number of encounterable collisions; performing a third comparison of (i) the remaining distance to be traversed and a pre-defined threshold, (ii) the remaining expected time taken to traverse and a pre-defined expected time threshold, and (iii) the remaining expected number of encounterable collisions and a pre-defined number of permissible collisions; and enabling the one or more agents to (i) traverse and navigate through an existing planned path or (ii) replan the existing planned path.

In an embodiment, the first mode and the second mode are distinct from each other.

In another aspect, there is provided a system for imperfect sensing-based analysis of agents deployed in environments for traversal task execution. The system comprises a memory storing instructions; one or more communication interfaces; and one or more hardware processors coupled to the memory via the one or more communication interfaces, wherein the one or more hardware processors are configured by the instructions to: obtain in a first mode, an input comprising one or more specifications, wherein the one or more specifications correspond to one or more of (a) one or more agents, (b) one or more associated sensors, (c) one or more tasks to be performed by the one or more agents, (d)

one or more sensor errors, (e) one or more zones, or (f) one or more environments; evaluate in the first mode, a distance to be traversed by the one or more agents in the one or more environments; evaluate in the first mode, a probability of failing to detect one or more obstacles by the one or more agents in a specific zone of the one or more zones based on the evaluated distance; evaluate in the first mode, (i) an expected time taken to traverse, and (ii) an expected number of encounterable collisions during execution of the one or more tasks based on the probability of failing to detect one or more obstacles by the one or more agents; perform in the first mode, a first comparison of (i) the evaluated expected time and a pre-defined expected time, (ii) the expected number of encounterable collisions and a pre-defined number of permissible collisions; and enable on the first comparison, deployment of the one or more agents in the one or more environments for execution of the one or more tasks based, wherein the one or more agents execute the one of more tasks in a second mode.

In an embodiment, the one or more hardware processors are further configured by the instructions to: evaluate sensitivity of each of the one or more associated sensors based on the first comparison; perform a second comparison of the evaluated sensitivity across the one or more associated sensors; and select at least a subset of sensors from the one or more associated sensors based on the second comparison.

In an embodiment, the one or more hardware processors are further configured by the instructions to: update one or more corresponding specifications from the one or more specifications based on the selected subset of sensors.

In an embodiment, the one or more corresponding specifications correspond to the one or more sensors and the one or more sensor errors.

In an embodiment, the one or more hardware processors are further configured by the instructions to: upon update of the one or more corresponding specifications, repeat the step of evaluating in the first mode, a probability of failing to detect one or more obstacles by the one or more agents in a specific zone of the one or more zones.

In an embodiment, the one or more hardware processors are further configured by the instructions to: continually evaluate in the second mode, during task execution by the one or more agents, via the one or more hardware processors, at least one of (i) remaining distance to be traversed, (ii) remaining expected time taken to traverse, and (iii) remaining expected number of encounterable collisions; perform a third comparison of (i) the remaining distance to be traversed and a pre-defined threshold, (ii) the remaining expected time taken to traverse and a pre-defined expected time threshold, and (iii) the remaining expected number of encounterable collisions and a pre-defined number of permissible collisions; and enable the one or more agents to (i) traverse and navigate through an existing planned path or (ii) replan the existing planned path.

In an embodiment, the first mode and the second mode are distinct from each other.

In yet another aspect, there are provided one or more non-transitory machine readable information storage mediums comprising one or more instructions which when executed by one or more hardware processors causes a method for imperfect sensing-based analysis of agents deployed in environments for traversal task execution by: obtaining in a first mode, via the one or more hardware processors, an input comprising one or more specifications, wherein the one or more specifications correspond to one or more of (a) one or more agents, (b) one or more associated sensors, (c) one or more tasks to be performed by the one or more agents, (d) one or more sensor errors, (e) one or more zones, or (f) one or more environments; evaluating in the first mode, via the one or more hardware processors, a distance to be traversed by the one or more agents in the one or more environments; evaluating in the first mode, via the one or more hardware processors, a probability of failing to detect one or more obstacles by the one or more agents in a specific zone of the one or more zones based on the evaluated distance; evaluating in the first mode, via the one or more hardware processors, (i) an expected time taken to traverse, and (ii) an expected number of encounterable collisions during execution of the one or more tasks based on the probability of failing to detect one or more obstacles by the one or more agents; performing in the first mode, via the one or more hardware processors, a first comparison of (i) the evaluated expected time and a pre-defined expected time, (ii) the expected number of encounterable collisions and a pre-defined number of permissible collisions; and enabling on the first comparison, via the one or more hardware processors, deployment of the one or more agents in the one or more environments for execution of the one or more tasks based, wherein the one or more agents execute the one of more tasks in a second mode.

In an embodiment, the method further comprises evaluating sensitivity of each of the one or more associated sensors based on the first comparison; performing a second comparison of the evaluated sensitivity across the one or more associated sensors; and selecting at least a subset of sensors from the one or more associated sensors based on the second comparison.

In an embodiment, the method further comprises updating one or more corresponding specifications from the one or more specifications based on the selected subset of sensors.

In an embodiment, the one or more corresponding specifications correspond to the one or more sensors and the one or more sensor errors.

In an embodiment, the one or more instructions which when executed by one or more hardware processors further causes upon updating the one or more corresponding specifications, repeating the step of evaluating in the first mode, via the one or more hardware processors, a probability of failing to detect one or more obstacles by the one or more agents in a specific zone of the one or more zones.

In an embodiment, the one or more instructions which when executed by one or more hardware processors further causes continually evaluating in the second mode, during task execution by the one or more agents, via the one or more hardware processors, at least one of (i) remaining distance to be traversed, (ii) remaining expected time taken to traverse, and (iii) remaining expected number of encounterable collisions; performing a third comparison of (i) the remaining distance to be traversed and a pre-defined threshold, (ii) the remaining expected time taken to traverse and a pre-defined expected time threshold, and (iii) the remaining expected number of encounterable collisions and a pre-defined number of permissible collisions; and enabling the one or more agents to (i) traverse and navigate through an existing planned path or (ii) replan the existing planned path.

In an embodiment, the first mode and the second mode are distinct from each other.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
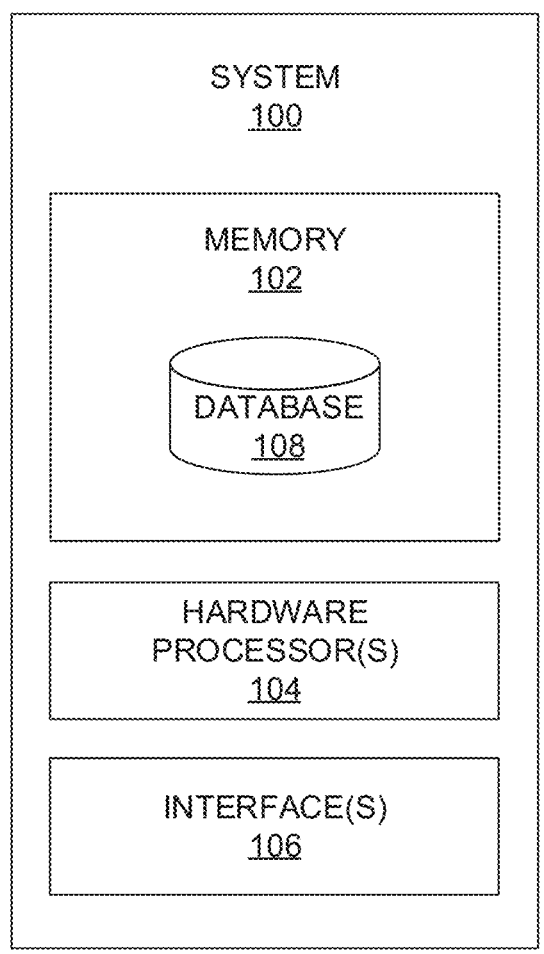
FIG. 1 depicts a system for imperfect sensing-based analysis of agents deployed in environments for traversal task execution, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Autonomous systems are increasingly making its way deeper into industries like automobile, manufacturing, logistics, etc. However, automation raises many concerns and the major ones stem from safety and reliability of the system while maintaining acceptable performance. For example, one of the concerns is the throughput of the system, e.g., the number of orders a fulfillment center is able to complete within a given time-frame. But, from the safety perspective, it is important to estimate, as an example, probability of collision of robots or autonomous vehicles in the system. These concerns are, however, generic and applicable across all domains.

Mobility is an essential task in most autonomous systems. The travel path is determined by some independent planner, given a floor-plan with known static obstacles in it. However, there may be temporary static obstacles on the planned path, unknown to the planner. For example, in a warehouse a box or a shelf may fall on the AGV's path. In such cases, the AGV's intrinsic obstacle avoidance procedure has to take appropriate action. Obstacle avoidance maneuver involves re-planning resulting in a longer path to travel. The problem of obstacle avoidance in an unknown environment is a well-studied problem (e.g., refer "J. Park, J.-H. Lee, S. H. Son, A survey of obstacle detection using vision sensor for autonomous vehicles, in: 2016 IEEE 22nd International Conference on Embedded and Real-Time Computing Systems and Applications (RTCSA), IEEE, 2016, pp. 264{264."—also referred as Park et al. and "A. Pandey, S. Pandey, D. Parhi, Mobile robot navigation and obstacle avoidance techniques: A review, Int Rob Auto J 2 (3) (2017) 00022."—also referred as Pandey et al.). Obstacle avoidance usually works in a sense→compute→actuate cycle. Imperfections in sensors result in inaccurate estimation of the AGV's environment. Further, inaccuracies may get compounded through the software stack that processes the sensor readings and may lead to unsafe actuations. Additionally, the error may accumulate over multiple cycles, leading to catastrophic failure. Imperfection anywhere in the processing cycle may cause collision with other entities or human in the vicinity (e.g., refer "J. Guiochet, M. Machin, H. Waeselynck, Safety-critical advanced robots: A survey, Robotics and Autonomous Systems 94 (2017) 43{52."—also referred as Guiochet et al. and "A. Dragan, S. Bauman, J. Forlizzi, S. Srinivasa, Effects of robot motion on human-robot collaboration, in: Proc. The 10th Annual ACM/IEEE Intl. Conf. on Human-Robot Interaction, ACM, 2015, pp. 51-58."—also referred as Dragan et al.), and therefore pose safety related concerns. A more elaborate discussion on sensing error classification and their effect on a robotic system can be found in research works (e.g., refer "R. R. Murphy, D. Hershberger, Classifying and recovering from sensing failures in autonomous mobile robots, in: Proc of the Natl. Conf. on Artificial Intelligence, 1996, pp. 922-929."—also referred as Murphy et al. and "C. Ferrell, Failure recognition and fault tolerance of an autonomous robot, Adaptive behavior 2 (4) (1994) 375-398."). However, research works, and prior art methods fail to provide or predict the effect of imperfections in sensing on the performance of the system. In the present disclosure, system and method are implemented with a generic motion model of an autonomous ground vehicle (AGV) system and analytically the effect of sensing errors on a set of defined performance metrics is studied. Though the AGV is illustrated by way of example, such illustrations shall not be construed as limiting the scope of the present disclosure, and the system and method of the present disclosure can be implemented in other agents such as unmanned aerial vehicles (e.g., drone, and the like). More specifically, the present disclosure involves the following technical aspects/features.

1. A generic analytical model of traversal task of an AGV, with obstacle avoidance maneuver and which incorporates imperfections in sensors. This model is further used by the present disclosure to derive analytical solutions to estimate a set of performance metrics.
2. Sensitivity of the sensor errors are analysed on these performance metrics. Sensitivity analysis helps in identifying the most critical components in each system. Such a study can also be used to increase the reliability of the system even before the actual deployment and thus enhance the overall safety or reliability of the deployed system.
3. The above model is experimental evaluated with a set of different robots equipped with different types of sensors, under Webots simulation framework. Through experiments, the effect of both independent and correlated sensing errors has been studied and conforming results between the model and the experimental results have been observed.

As mentioned above, a generic motion model of an AGV in a partially known environment is implemented by the present disclosure to analytically evaluate the effect of sensing errors on the performance and safety of the AGV. The problem of autonomous motion and obstacle avoidance for unmanned vehicles is well studied in literature (e.g., refer "M. Radmanesh, M. Kumar, P. H. Guentert, M. Sarim, Overview of path planning and obstacle avoidance algorithms for uays: A comparative study, Unmanned systems 6 (02) (2018) 95-118."—also referred as Radmanesh et al.).

Researchers usually have concentrated on a particular aspect of an autonomous system. For example, researchers have proposed analytical models for obstacle characteristics (e.g., refer "G. Klancar, B. Zupancic, R. Karba, Modelling and simulation of a group of mobile robots, Simulation Modelling Practice and Theory 15 (6) (2007) 647-658."—also referred as Klancar et al.), collision detection and avoidance (e.g., refer Klancar et al, "A. Bajo, N. Simaan, Kinematics-based detection and localization of contacts along multisegment continuum robots, IEEE Transactions on Robotics 28 (2) (2011) 291-302."—also referred as Bajo et al., and "T. Tomic, C. Ott, S. Haddadin, External wrench estimation, collision detection, and reflex reaction for flying robots, IEEE Transactions on Robotics 33 (6) (2017) 1467-1482."—also referred as Tomic et al.), path planning (e.g., "T. T. Mac, C. Copot, D. T. Tran, R. De Keyser, Heuristic approaches in robot path planning: A survey, Robotics and Autonomous Systems 86 (2016) 13-28."—also referred as Mac et al., "S. X. Yang, C. Luo, A neural network approach to complete coverage path planning, IEEE Transactions on Systems, Man, and Cybernetics, Part B (Cybernetics) 34 (1) (2004) 718-724."—also referred as Yang et al., and "Z. Qu, J. Wang, C. E. Plaisted, A new analytical solution to mobile robot trajectory generation in the presence of moving obstacles, IEEE Transactions on Robotics 20 (6) (2004) 978-993."—also referred as Qu et al.), motion planning and control (e.g., "J. Laumond, et al., Robot motion planning and control, Vol. 229, Springer, 1998."), etc. All these problems are related to autonomous motion. In the present disclosure, the system and method focus on obstacle detection and avoidance. Another research has investigated the level of model fidelity required by a model predictive control (MPC) in high speed AGV moving in unknown environment. The authors in this have considered five different representations of vehicle dynamic models with four different degrees of freedom for AGV, in environments with various obstacle characteristics.

Safety in autonomous systems is also well studied in literature. Ensuring safety through demarcation of safety zones around robots is widely used in industrial automation domain. Distance threshold based red-yellow-green zone characterization is a common demarcation approach for vehicles. One of the research presents a solution to ensure safety in human-robot collaborative workspace. The safety concept is capable of establishing both manually defined safety zones and dynamically generated safety zones that are based on robot joint positions and velocities, thus offering a maximum free space around the robot for its user. On the other hand, techniques like formal verification, perform static analysis on a certain autonomous system to certify it to be safe. Modelling the system plays a central role in such approach. However, modelling system behaviour under sensing error has not been investigated. Present disclosure has implemented a generic motion model of an AGV, with obstacle avoidance, and the model is sensitive to sensing errors. Such a model is useful to analyze its motion behaviour in environment with unknown obstacles and imperfect sensing. This model can also be used analyze performance degradation of a system due to aging. To the knowledge of the author no such study has been done.

Referring now to the drawings, and more particularly to FIGS. 1 through 12B, where similar reference characters denote corresponding features consistently throughout the figures, there are shown preferred embodiments and these embodiments are described in the context of the following exemplary system and/or method.

FIG. 1 depicts a system 100 for imperfect sensing-based analysis of agents deployed in environments for traversal task execution, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises one or more specifications, wherein the one or more specifications correspond to one or more of one or more agents (e.g., autonomous ground vehicles, drones, and the like), one or more associated sensors, one or more traversal tasks to be performed by the one or more agents, one or more sensor errors, one or more zones, or one or more environments. The database 108 further stores information on evaluated (a) distance to be traversed by the one or more agents in the one or more environments, (b) probability of failing to detect one or more obstacles by the one or more agents, and the like.

The database 108 further stores information on (i) an expected time taken to traverse, and (ii) an expected number of encounterable collisions during execution of the one or more traversal tasks based on the probability of failing to detect one or more obstacles by the one or more agents. Information stored in the database 108 further comprises one or more pre-defined thresholds such as a pre-defined expected time, a pre-defined number of permissible collisions, and the like. The database 108 further stores information on planned paths, re-planned paths (in real-time or near-real time navigation by agents).

The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
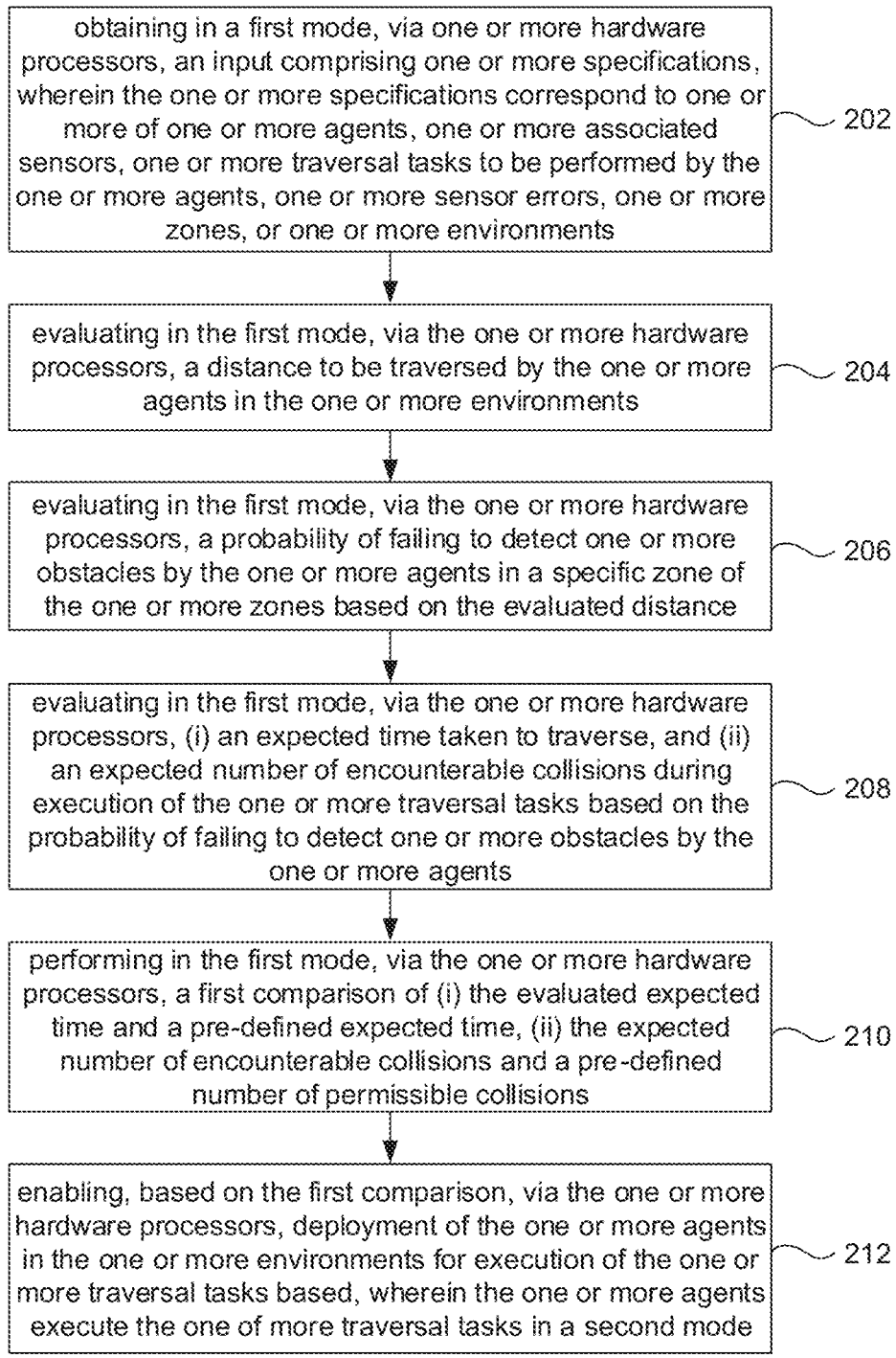
FIG. 2 depicts an exemplary flow chart illustrating a method for imperfect sensing-based analysis of agents deployed in environments for traversal task execution, using the system of FIG. 1, in accordance with an embodiment of the present disclosure.

FIG. 2, with reference to FIG. 1, depicts an exemplary flow chart illustrating a method for imperfect sensing-based analysis of agents deployed in environments for traversal task execution, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. In any autonomous system, the hardware and software components are closely inter-linked. Typically, the relation is non-linear and varies across components and therefore it is difficult to create a detailed model of the system. Instead, the present disclosure models the behaviour of an AGV system (or the system 100) from the point of view of a traversal task, with the aim to produce a generic model, which incorporate the effect of inaccuracies in sensor readings for a set of performance metrics. This enables to study the effect of sensing inaccuracies.

The present disclosure considers an AGV navigating in a partially mapped region to a pre-defined destination point, and the path of the vehicle is already planned. The planned path avoids known obstacles, but there may be unknown static obstacles on the path. For the sake of brevity, in this formulation dynamic obstacles like human beings or other AGVs crossing its path are not considered. The vehicle is equipped with sensors to detect obstacles and can perform obstacle avoidance maneuver based on sensing. Two performance metrics are considered—the estimated completion time of the task and the number of possible collisions. The objective is to: (i) study the performance of the system under faulty sensors, for both uncorrelated and correlated failure models, and (ii) estimate the sensitivity of each of the individual sensors, as well as identify the sensors which are most sensitive for the task. The steps of the method of the present disclosure will now be explained with reference to components of the system 100 of FIG. 1, the block diagram of FIG. 2, and other diagrams as depicted in FIGS. 3 through 12B. In an embodiment, at step 202 of the present disclosure, the one or more hardware processors 104 obtain, in a first mode, an input comprising one or more specifications. The one or more specifications correspond to one or more of one or more agents, one or more associated sensors, one or more traversal tasks to be performed by the one or more agents, one or more sensor errors, one or more zones, or one or more environments, in one example embodiment. For example, a Kheperra III robot (also referred as agent and interchangeably used herein) equipped with nine infrared distance sensors, a GPS sensor and a compass sensor is assigned the task to traverse from a given source location to a destination location. The distance sensors are faulty with Gaussian distribution error with mean μ and variance σ. The zone within $r_R$ radius from the distance sensor is known as a first zone (e.g., a red zone and interchangeably used herein), the zone beyond radius $r_R$ but within radius $r_Y$ is known as a second zone (e.g., a yellow zone and interchangeably used herein). The zone beyond radius $r_Y$ is known as a third zone (e.g., a green zone and interchangeably used herein). The environment consists of obstacles of mean radius $\mu_R$. The above example may be better understood by way of following description.

Consider an autonomous vehicle which traverses from its present location $S=(x_s, y_s)$ to a target location $D=(x_d, y_d)$. Given such a pair of locations, the vehicle traverses in a planned path (provided by a higher-level planner), avoiding obstacles, unknown to the planner. As a requirement for obstacle detection and avoidance, the vehicle is assumed to be equipped with an array of sensors (possibly heterogeneous in nature). A computing element or a control software, running on board, processes inputs from these sensors and generate actuation signals to the driving wheels. In the following sub-sections, the behavior of an AGV is modeled for a traversal task.

Referring to steps of FIG. 2, at step 204 of the present disclosure, the one or more hardware processors 104 evaluate in the first mode, a distance to be traversed by the one or more agents in the one or more environments. For example, the robot has to traverse from a source location $S=(x_s, y_s)$ to the destination location $D=(x_d, y_d)$. The euclidean distance between S and D be d. However, the actual distance that needs to be traversed by the robot is greater than d due to obstacle avoidance maneuver. Each time the robot encounters an obstacle in its path (i.e., the distance between the robot and the obstacle is less than $r_Y$), it executes collision avoidance maneuver until the distance between the robot and the obstacle is greater than $r_Y$. After that the robot merges with its previously planned path.

In an embodiment, at step 206 of the present disclosure, the one or more hardware processors 104 evaluate in the first mode, a probability of failing to detect one or more obstacles by the one or more agents in a specific zone of the one or more zones based on the evaluated distance. Due to error in distance sensors, the robot is unable to measure the distance from the obstacles accurately. Therefore, there is a probability that the obstacle is present in the yellow zone, but the robot fails to detect it. The value varies between 0-1, in one example embodiment. In an embodiment, at step 208 of the present disclosure, the one or more hardware processors 104 evaluate in the first mode, (i) an expected time taken to traverse, and (ii) an expected number of encounterable collisions during execution of the one or more traversal tasks based on the probability of failing to detect one or more obstacles by the one or more agents. The expected time taken to traverse is greater than 0. For example, when the AGV need to traverse a planned path length of 100 meter at a constant speed of 5 m/s, the expected traversal time is 20 seconds, given there is no obstacle on its path. The number of encounterable collisions during execution of the given task is an integer value (>=0). The above-mentioned example and the steps 204, 206, and 208 can be better understood by way of following description.

Figure 3:
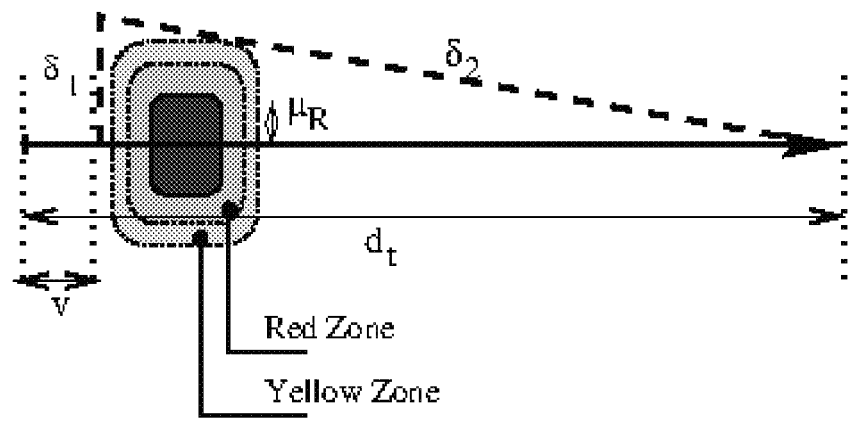
FIG. 3 depicts a deviated path model, in accordance with an example embodiment to the present disclosure.
Figure 4:
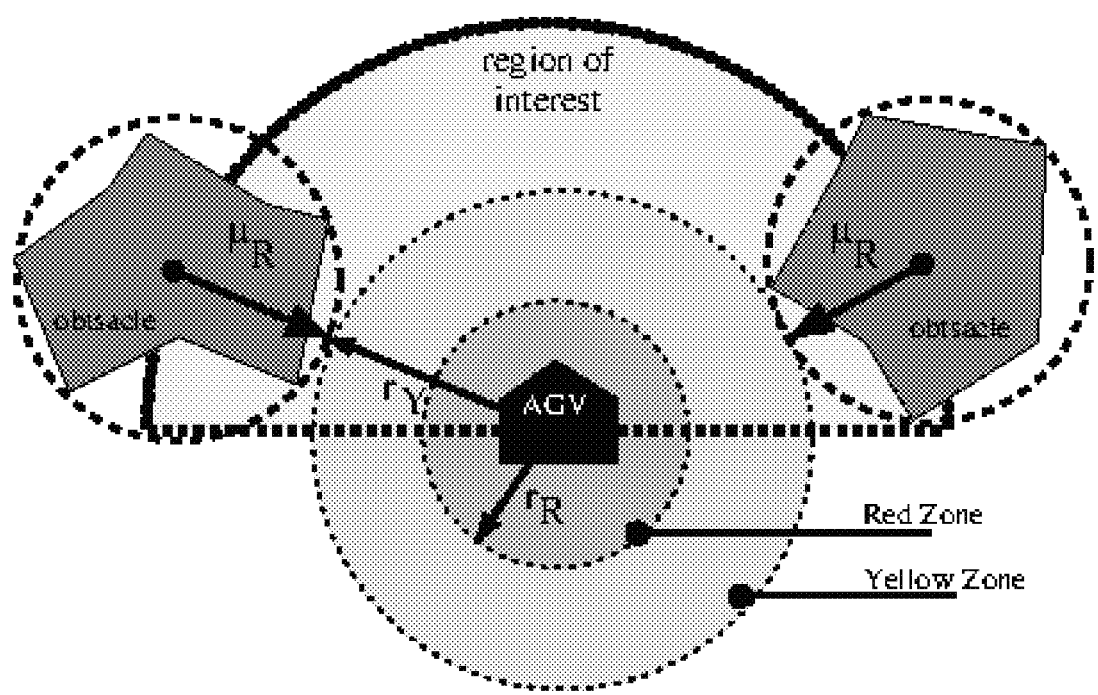
FIG. 4 depicts Region of interest (RoI) in the path of the AGV, in accordance with an example embodiment of the present disclosure.

As mentioned, the AGV is assumed to be holonomic. The AGV can be in either of the three zones—red, yellow, or green, relative to obstacles. The innermost zone—the circle with radius $r_R$ is known as the red zone. The yellow zone is defined as the annulus with inner radius $r_R$ and outer radius $r_Y$. The region beyond the radius $r_Y$ is known as the green zone. FIGS. 3 and 4 depict the red and yellow zones, and the rest of the space is in green zone. More specifically, FIG. 3, with reference to FIGS. 1 and 2, depicts a deviated path model, in accordance with an example embodiment to the present disclosure. FIG. 4, with reference to FIGS. 1 through 3, depicts Region of interest (RoI) in the path of the AGV, in accordance with an example embodiment of the present disclosure. The motion of the vehicle depends on the presence of the AGV in a zone relative to obstacles. The vehicle follows its planned path when it is in the green zone. However, when an obstacle enters the yellow zone, first it performs evasive maneuvers to get around the obstacle and then re-plans its path which eventually merges with its earlier planned path. It is assumed that the re-planned path does not differ drastically from its previous planned path. A traversal model based on such obstacle avoidance model is described below.

Let the length of the planned path between S and D be d. Let the total travel time of the vehicle be denoted as T, which needs to be estimated. The traversal of the vehicle is approximated as a discrete model in time. At each time instance the vehicle processes its sensor readings and travels v distance, in accordance with the sense→compute→actuate cycle. The model also assumes a constant velocity v of the vehicle, i.e., at every time instance the vehicle always travels v distance. The controller of the AGV triggers the obstacle avoidance maneuver each time any obstacle is detected within the yellow or red zone thereby increasing the remaining traversal time. Let, at the time instance t, the estimated distance to be traversed by the vehicle to reach the target location from its present location is denoted as $d_t$. So, when a traversal task is initiated, the estimated distance to be traversed by the vehicle be $d_0 = d$. Let the probability of detecting an obstacle in each time cycle be p. Hence with probability p the obstacle maneuver is triggered, and the vehicle takes the alternative longer path, shown as dashed line in FIG. 3. With this model of traversal, the following recurrence can be presented:

$d_0 = d$
$d_T = 0$ $$d_{t+1} = (1-p)(d_t + v) + p(\delta_1 + \delta_2) \quad (1)$$

The above equation (1) represents the evaluation of distance to be traversed by the one or more agents in the one or more environments, in one example embodiment. According to the system 100 and method of the present disclosure, the traversal algorithm comprised in the memory 102 triggers obstacle avoidance maneuver when the sensors identify obstacle within the yellow zone. Also, any obstacle entering the red zone is assumed to collide with the vehicle. Therefore, the embedded processing endeavors to guide the vehicle in such a manner such that no obstacle enters the red zone. The navigation system is also assumed to drive the vehicle such that the obstacle is in the green zone. So, the minimum distance of the nearest obstacle is always $r_Y$. The obstacles are modeled as convex objects with mean radius of R. The estimation of deviated path length, in reference to FIG. 1, is as follows:

$$\delta_1 = \mu_R + r_Y$$

$$\delta_2 = \sqrt{(d_t - v)^2 + \delta_1^2}$$
$$= (d_t - v)\sqrt{1 + \left(\frac{\delta_1}{d_t - v}\right)^2}$$
$$\approx (d_t - v)\left(1 + \frac{1}{2}\left(\frac{\delta_1}{d_t - v}\right)^2\right) \ldots \text{assuming } \delta_1 \ll d_t - v$$
$$= (d_t - v) + \frac{\delta_1^2}{2(d_t - v)}$$

Now, with these estimations, Equation (1) is expanded and simplified as follows:

$$d_{t+1} = (1-p)(d_t - v) + p\left(\delta_1 + (d_t - v) + \frac{\delta_1^2}{2(d_t - v)}\right)$$
$$= (d_t - v) + p\left(\delta_1 + \frac{\delta_1^2}{2(d_t - v)}\right)$$
$$\Rightarrow d_t - d_{t+1} = v - p\delta_1\left(1 + \frac{\delta_1}{2(d_t - v)}\right)$$

Since it is assumed as $\delta_1 \ll (d_t - v)$, it is further approximated with $$\frac{\delta_1}{2(d_t - v)} \sim \to 0,$$

$d_t - d_{t+1} = v - p\delta_1$

Hence the recurrence can be simply solved as, $$\sum_{t=0}^{T}(d_t - d_{t+1}) = d_0 - d_T = d = T(v - p\delta_1) \quad (2)$$
$$\Rightarrow T = \frac{d}{v - p\delta_1} = \frac{d}{v - p(\mu_R + r_Y)}$$

The unknown obstacles are modeled to follow some stochastic distribution with mean $\mu_O$, which defines the density distribution of centroids of obstacles in the area. As the vehicle traverses, the expected probability to encounter an obstacle is $p = A \times \mu_O$, where A is the area for the region of interest (RoI) to the vehicle. This area affect alteration in motion (refer to FIG. 4). The planned path of the vehicle changes when an obstacle enters the yellow region. As the vehicle traverses, the perimeter of the RoI advances, bringing possible obstacle within RoI. As the vehicle moves with a speed of v, the perimeter of RoI sweeps new area of size $v \times \pi(\mu_R + r_Y)$. The probability of obstacles in the new sweep area is computed which is:

$p = A \times \mu_O = v\pi(\mu_R + r_Y) \times \mu_O$

So, the above expected value for travel time transforms into the following form, $$E(T) = \frac{d}{v - (v\mu_O\pi(\mu_R + r_Y))(\mu_R + r_Y)} \qquad (3)$$

$$= \frac{d}{v} \frac{1}{1 - \mu_O\pi(\mu_R + r_Y)^2}$$

The scenario for faulty sensor(s) is described below:

In a practical scenario the readings from the sensors are not always perfect. Inaccuracies are caused due to manufacturing defects (internal) or change in environmental conditions (external), like fog or increase in suspended particles in air, etc. Here, the deviation ($\delta_1$) can be computed wherein the vehicle is likely to take in presence of error in its distance sensors. First, a simplest case is considered where only one sensor is used for obstacle detection.

Let x be the actual distance of an obstacle. The case when the obstacle is in the yellow band is of interest, defined to be the yellow zone excluding the red zone, i.e., $r_Y > x > r_R$ and $r_Y > r_R$. The width of the yellow band be $b_Y = r_Y - r_R$. The control algorithm comprised in the memory 102 always endeavors to ensure no obstacle enters the yellow or the red zone. When the vehicle is able to detect the obstacle on its path while it has crossed the green zone and entered the yellow zone, the vehicle needs to travel $b_Y$ distance such that the obstacle is out of the yellow zone. However, when the obstacle crosses the yellow zone and enters the red zone due to sensor failure, this is denoted as a collision. The failure to detect obstacle in the yellow zone, given that the sensors can be faulty, is a conditional case. An obstacle is present in the yellow zone and the sensor fails to detect it to be in the yellow zone when the associated sensing error is more than the yellow bandwidth ($\epsilon > b_Y$). So, the probability of failure to detect obstacle in yellow zone, when it is there, is denoted as $Pr(\overline{D_Y}O_Y)$, where $O_Y$ is the event that an obstacle is in its yellow zone and $\overline{D_Y}$ denotes event of failure to detect the obstacle in yellow zone.

$$Pr(\overline{D_Y}O_Y) = F_\epsilon(\epsilon > b_Y) = 1 - F_\epsilon b_Y$$

where, $F_\epsilon$ is the CDF of the error distribution associated with the sensor.

In FIG. 4, the condition is elucidated for a RoI for the vehicle's sensing system. FIG. 4 shows the case when the planned traversal path leads the vehicle through two obstacles on both sides. To pass through the narrow path between them, the vehicle needs to sense their presence. The boundary condition of the place of the obstacle is when their periphery just touches the yellow zone as the robot passes through them. If the relative distance between the obstacle is more than that, sensing one of them is sufficient. The area marked with bold dotted grey/black line is denoted as the RoI when the vehicle begins its movement through the narrow path between the obstacles. The sensing system or system 100 should detect obstacles at the periphery of the region to be identified as them being in the yellow region. Since obstacles behind does not interfere with the traversal, the RoI is a semi-circular space. The obstacles at the periphery are of interest to start an obstacle avoidance maneuver. Since the obstacles have mean diameter of $\mu_R$, the obstacle can be present in a semicircular band of width $\mu_R$ at distance of $r_Y$ from the vehicle. So, the probability of obstacles in this periphery is, $$Pr(O_Y) = F_O\left(\frac{\pi}{2}((2\mu_R + r_Y)^2 - r_Y^2)\right)$$

$$= F_O(2\pi\mu_R(\mu_R + r_Y))$$

where $F_O$ is the CDF of the distribution of the obstacle centroid in the given space.

Therefore, the conditional probability, that the sensor fails to detect an obstacle given the object is in the yellow zone, is expressed as $Pr(\overline{D_Y}|O_Y)$ and is computed as, $$Pr(\overline{D_Y} | O_Y) = \frac{Pr(\overline{D_Y} | O_Y)}{Pr(O_Y)} \qquad (4)$$

$$= \frac{1 - F_\epsilon b_Y}{F_O(2\pi\mu_R(\mu_R + r_Y))}$$

The imperfect sensing affects obstacle avoidance maneuver and hence its path; and introduces possibility of collision. First, modification required to cater in sensing imperfections are incorporated to estimation of task completion time. When the obstacle is not detected within the yellow zone and it enters the red zone, the vehicle is required to maneuver in such a way that the obstacle is no longer found in its red zone before performing obstacle avoidance maneuver. In this case it traverses additional $b_Y$ distance. So, $\delta_1 = (1 - Pr(\overline{D_Y}|O_Y))(\mu_R + r_Y) + Pr(\overline{D_Y}|O_Y) \quad (\mu_R + r_Y + b_Y) = (\mu_R + r_Y) + Pr(\overline{D_Y}|O_Y) \times b_Y$ (refer to FIG. 3). The recurrence solution in Equation (3) is modified as follows, $$E[T] = \frac{d}{v - v\mu_O\pi(\mu_R + r_Y)} \qquad (5)$$

$$(\mu_R + r_Y + \overline{Pr(D_Y)} | O_Y) \times b_Y)$$

$$= \frac{d/v}{1 - \mu_O(\mu_R + r_Y)(\mu_R + r_Y + b_Y Pr(\overline{D_Y} | O_Y))}$$

Estimate of the number of collisions is now being described and discussed. For this it is noted that the semantics of the safety regions around the vehicle implies that the vehicle tries to ensure that no obstacle is found in the red zone. Semantically any obstacle entering the red zone is equivalent to collisions and the expected number of times obstacle entering the red zone is counted as the number of collisions. The estimated distance traveled by the vehicle is $v \times E[T]$. So, the area under surveillance during its traversal is $vE[T] \times 2(\mu_R + r_Y)$. Since the density of obstacles in the arena is $\mu_O$, the expected number of obstacles in the path is $2vE[T](\mu_R + r_Y) \times \mu_O$. Hence the expected number of collisions is:

$$E[CC] = 2\pi\mu_O(\mu_R + r_Y)E[T]\overline{Pr(D_Y} | O_Y) \qquad (6)$$

$$= \frac{2d\mu_O(\mu_R + r_Y)Pr(\overline{D_Y} | O_Y)}{1 - \mu_O(\mu_R + r_Y)(\mu_R + r_Y + b_Y Pr(\overline{D_Y} | O_Y))}$$

Referring to steps of FIG. 2, in an embodiment of the present disclosure, at step 210, the one or more hardware processors 104 perform, in the first mode, a first comparison of (i) the evaluated expected time E[T] and a pre-defined expected time, (ii) the expected number of encounterable collisions E[CC] and a pre-defined number of permissible collisions. The acceptable criteria/thresholds are application specific and user defined, in one embodiment of the present disclosure. For example, the user can define that the evaluated expected time or the number of encounterable collisions cannot be greater than twice the pre-defined expected time or pre-defined number of permissible collisions, respectively. The acceptable criteria/thresholds are application specific and are empirically derived by the system 100, in another embodiment of the present disclosure.

In an embodiment of the present disclosure, at step 212, the one or more hardware processors 104 enable, based on the first comparison, deployment of the one or more agents in the one or more environments for execution of the one or more traversal tasks based, wherein the one or more agents execute the one of more traversal tasks in a second mode. In case, the comparison satisfies then the one or more agents are deployed in the one or more environments. Else the steps 206 till 210 are repeated and then deployment of the agents in the environment for traversal task execution is carried out. In an embodiment, the first mode and the second mode are distinct from each other. More specifically, the first mode is an offline mode, and the second mode is an online mode (or real-time scenario mode).

In case values of E[T] and E[CC] are not acceptable upon the first comparison, the system 100 or the agents are not deployed in the environments for traversal task execution. More specifically if the values of E[T] and E[CC] are not acceptable, the one or more hardware processors 104 evaluate sensitivity of each of the one or more associated sensors based on the first comparison. A second comparison of the evaluated sensitivity across the one or more associated sensors. At least a subset of sensors from the one or more associated sensors based on the second comparison. In the sensitivity analysis, the effect of individual sensor errors on the performance of the task is evaluated. For example, in Kheperra III there are 9 distance sensors. Each of the distance sensors are individually injected with Gaussian distributed error and its effect on the performance of the task is observed. A sensitivity value is evaluated for each individual sensor. This value denotes the impact of the sensor on the performance of the given traversal task. The sensitivity value of each of the sensors is then compared across sensors of the system 100 or agent. The sensor with highest sensitivity has the greatest impact on the performance of the given traversal task. To increase the reliability of the overall system, the reliability of the sensor with highest sensitivity should be increased. Upon increasing the reliability of the sensor(s) having highest sensitivity, one or more corresponding specifications from the one or more specifications are updated based on the selected subset of sensors. The one or more corresponding specifications in this case correspond to the one or more sensors and the one or more sensor errors. This step of sensitivity analysis and its effect on system performance is repeated until the system performance is greater than or equal to the acceptable performance. The above step of evaluating sensor sensitivity is better understood by way of following description.

Scenarios where multiple sensors installed on a vehicle for sensing obstacles around it are considered by the embodiments of the present disclosure. This is usually the design of most of the autonomous vehicles where multiple heterogeneous sensors are used to facilitate more accurate perception of the environment around. The importance of reading from a sensor is based on the motion of the vehicle. For example, when the vehicle moves forward, the sensors which detect obstacles ahead of the vehicle are more important than the rear sensors; while the rear ones are more important when the vehicle is backing up.

In the present disclosure, sensitivity of a sensor is defined, as the deviation in the estimated performance measure of the system 100 (or agent/robot/drone) given the reading of the sensor deviates from its expected value due to error. The sensing error is modelled as a distribution with a mean $\mu_\epsilon$ and deviation be $\sigma_\epsilon$. For sensitivity analysis deviation of the error is more important than its mean, since a known mean error can be easily handled by the processing unit treating it as offset.

When there are multiple sensors, and each of these sensors is associated with its own error variations, modelled as a distribution with variation $\sigma_{\epsilon_i}$ (for the $i^{th}$ sensor). The mean and deviation of the overall error distribution of the system, using this set of sensors is denoted as $\mu_\epsilon$ and $\sigma_\epsilon$ respectively, as discussed earlier. The relationship between $\sigma_{\epsilon_i}$'s and $\sigma_\epsilon$ are related by some transfer function, defined by the system, and is denoted in the present disclosure as $\sigma_\epsilon = \emptyset(\overline{\sigma_\epsilon})$, where $\overline{\sigma_\epsilon} = \{\sigma_{\epsilon_i} : 0 \leq i \leq n\}$.

Given a system performance measure $\mathcal{M}$ which is a function of sensing error, expressed as $\mathcal{M}(\sigma_\epsilon)$, sensitivity of a sensor is defined as:

$$\frac{\partial \mathcal{M}(\sigma_\epsilon)}{\partial \sigma_{\epsilon_i}} = \frac{\partial \mathcal{M}(\sigma_\epsilon)}{\partial \sigma_\epsilon} \frac{\partial \emptyset(\overline{\sigma_{\epsilon_i}})}{\partial \sigma_{\epsilon_t}}$$

For example, when the performance measure is the estimated travel time of the vehicle, sensitivity of a sensor is expressed as, $$\frac{\partial E[T]}{\partial \sigma_{\epsilon_t}} = \frac{E[T]^2 \nu \mu_O(\mu_R + r_Y)}{d} \frac{\partial Pr(\overline{D_Y} \mid O_Y)}{\partial \sigma_\epsilon} \frac{\partial \emptyset(\sigma_{\epsilon_i})}{\partial \sigma_{\epsilon_i}} \quad (7)$$

Once the one or more agents are deployed in the respective environment(s) in real-time (second mode)), at least one of (i) remaining distance to be traversed, (ii) remaining expected time taken to traverse, and (iii) remaining expected number of encounterable collisions are continually evaluated during traversal task execution by the one or more agents. The value of remaining distance to be traversed and the remaining expected time taken to traverse can be any value greater than 0, in one example embodiment. The value of remaining expected number of encounterable collisions is an integer number, in one example embodiment. A third comparison is performed between (i) the remaining distance to be traversed and a pre-defined threshold, (ii) the remaining expected time taken to traverse and a pre-defined expected time threshold, and (iii) the remaining expected number of encounterable collisions and a pre-defined number of expected/permissible collisions. The acceptable criteria/thresholds are application specific, and user defined, in one embodiment. For example, the user can define that the evaluated expected time or the number of encounterable collisions cannot be greater than twice the pre-defined expected time or pre-defined number of permissible collisions, respectively. The acceptable criteria/thresholds are application specific, and are empirically derived, in another embodiment. For example, the system 100 can define that the evaluated expected time or the number of encounterable collisions cannot be greater than twice the pre-defined expected time or pre-defined number of permissible collisions, respectively. The one or more agents are enabled and/or configured to (i) traverse and navigate through an existing planned path or (ii) re-plan the existing planned path based on the third comparison. If the third comparison does not satisfy the conditions, then the agent(s) re-plan the existing planned path. Else the agents traverse and navigate through the existing planned path in case of the conditions being satisfied (refer third comparison). Experimental results:

To validate the model as implemented by the present disclosure and its system 100 and the method of FIG. 2, as described above, a series of various experiments were performed in Webots simulation system (e.g., refer "Cyberbotics Ltd., Webots, https://https://www.cyberbotics.com, accessed: 020-01-13."). The present disclosure assumes that the obstacle distribution follows Gamma distribution model and sensing errors follows Gaussian distribution. The closed form performance metrics are computed as shown below. Present disclosure tested the implemented model herein using three different robots—Khepera III, Pioneer 3-DX, and Pioneer 3-AT, using three different sensors—infrared, Kinect, and Lidar sensors. The model of the robots as well as sensors are already available with the Webots distribution. A more detailed description of the robots is presented in further sections, followed by the experimental results, which compares the performance measures from the simulation with the estimated value from our model.

$$F_\epsilon(x) = \frac{1}{2}\left[1 + \mathrm{erf}\left(\frac{x}{\sigma_\epsilon \sqrt{2}}\right)\right]$$

The conditional probability of detection failure can be computed as follows.

$$Pr(\overline{D_Y} \mid O_Y) = \frac{\Gamma(k)}{2} \frac{1 - \mathrm{erf}\left(\frac{b_Y}{\sigma_\epsilon \sqrt{2}}\right)}{\gamma(k, 2\pi\mu_O \mu_R r_Y (\mu_R + r_Y)/k)} \quad (8)$$

where, $\theta = \mu_O/k$ replaced in the gamma distribution.

Figure 5:
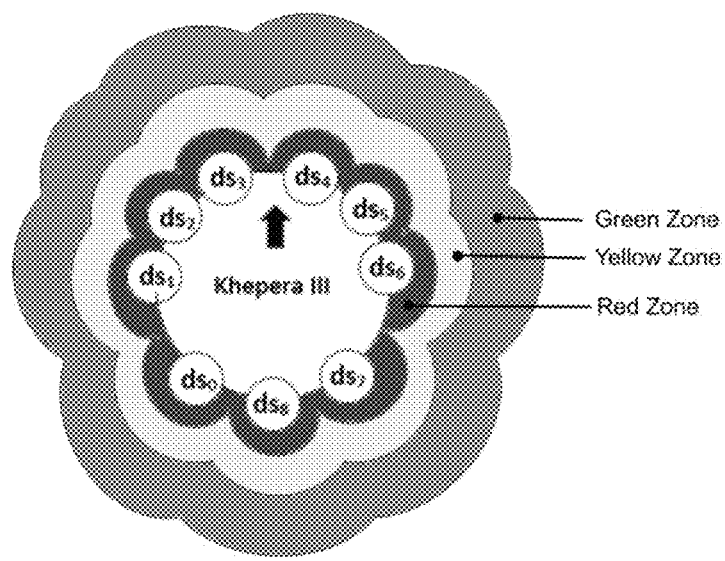
FIG. 5 depicts proximity sensor arrangements around Khepera-III and corresponding zone demarcation, in accordance with an example embodiment of the present disclosure.

Description of Robots:

In experiments conducted by the present disclosure, three different kinds of autonomous vehicles, equipped with different sensors were used. Table 1 presents the essential attributes of the vehicles. Only Khepera III, is equipped with an array of proximity sensors and their positions are depicted in FIG. 5. More specifically, FIG. 5, with reference to FIGS. 1 through 4, depicts proximity sensor arrangements around Khepera-III and corresponding zone demarcation, in accordance with an example embodiment of the present disclosure.

TABLE 1

(Description of robots used in experiments)

| Robot | Max velocity (m/s) | Avg velocity (m/s) | Proximity sensor type | Proximity sensor | Max range (m) | Field of view | $r_R$ (m) | $r_Y$ (m) | Other sensors |
|---|---|---|---|---|---|---|---|---|---|
| Kheperra III | 0.3 | 0.21 | Infrared | 9(ds0-ds8) | 0.5 | 360° | 0.026 | 0.086 | Ground sensor, Ultrasonic sensor, GPS, Compass |
| Pioneer 3-DX | 1.2 | 0.45 | Microsoft Kinect ® | 1 | 3.5 | 70.6 × 60° | 0.5 | 1 | Sonar sensors, GPS, Compass |
| Pioneer 3-AT | 0.7 | 0.46 | Sick LMS 291 Lidar | 1 | 80 | 180° | 1 | 1.5 | Sonar sensors, GPS Compass |

Model Specific to Experiment Setup: It is assumed by the present disclosure that obstacles are randomly distributed in the arena i.e., follows gamma distribution with parameters (k, θ). Therefore, $\mu_O = k\theta$. Also, k, θ≥0. Since the obstacles are not point objects and should be detectable by sensing system, and therefore at least comparable to the vehicle in dimension. This implies that the gamma distribution is not a flat distribution and hence k≥1. Since $\mu_O$ is represented as the density of obstacle in the arena, the additional constraint is 0≤$\mu_O$≤1. For the gamma distribution CDF is expressed as, $$F_O(x) = \frac{1}{\Gamma(k)}\gamma\left(k, \frac{x}{\theta}\right)$$

Also, it is assumed that the errors induced in the readings are normally distributed about 0 i.e., follows N($\mu_\epsilon$=0, $\sigma_\epsilon^2$). For the normal distribution CDF is expressed as, Control System Description A generic description of the control system of the autonomous vehicles used in the experiments by the present disclosure is described. The task of the vehicles is to traverse to a specified destination location through a set of waypoints, ensuring collision avoidance with obstacles. During traversal, the robot determines its position and orientation using readings from GPS and compass and also used in the navigation algorithm to drive the robot towards its next target location. The plan of movement of the robot is described in Algorithm 2 (or pseudo code 2 detailed below). Without any obstacle in sight, the vehicle aligns itself to the planned path and travels.

When the vehicle detects obstacle in its path, an obstacle avoidance maneuver is performed, for example a Braitenberg (at line 4 of Algorithm 2—(or pseudo code 2 detailed below)). The actuation algorithm is to set motor speed to individual motors and drive the vehicle in the intended direction. This is vehicle dependent. Different motor speeds, appropriately applied on the wheels, allows the vehicle to navigate a curved path.

Algorithm 1/Pseudo code 1 for zone demarcation procedure for AGV:

---
Algorithm 1/Pseudo code 1 for zone demarcation procedure for AGV:
---

Function findzone ($\vec{S}, \vec{Th_R}, \vec{Th_Y}$):
Input: $\vec{S} = \{s_i : 0 \leq i < n\}$;    // sensor readings
Input: $\vec{Th_R} = \{Th_R^i : 0 \leq i < n\}$;    // red-zone thresholds
Input: $\vec{Th_Y} = \{Th_Y^i : 0 \leq i < n\}$;    // yellow-zone thresholds
Output: zone
begin
  if ($\exists s_i : s_i \leq Th_R^i$) then
    zone ← Red;
  end
  else if ($\exists s_i : s_i \leq Th_Y^i$) then
    zone ← Yellow;
  end
  else
    zone ← Green;
  end
end The above pesudo code 1 is one of an examplary implementation and such implementation and execution by the system 100 shall not be construed as limiting the scope of the present disclsoure.

---
Algorithm 2/Pseudo code 2 for Traversal of an AGV
---

Input: D = ($x_d, y_d$);    // destination location
Data: $\vec{Th_R} = \{Th_R^i : 0 \leq i < n\}$;    // red-zone thresholds
Data: $\vec{Th_Y} = \{Th_Y^i : 0 \leq i < n\}$;    // yellow-zone thresholds
begin
  while Current location is not D do
    SENSE:
    $\vec{S}$ = Read proximity sensor values;
    zone = findzone ($\vec{S}, \vec{Th_R}, \vec{Th_Y}$);
    COMPUTE:
    if zone = Green then
      Align pose towards D using GPS and Compass;
      Move forward;
    else
      if zone = Yellow then
        Apply Braitenberg algorithm to determine direction to move;
      Else
        // zone = Red
        Move backward;
        if signaturePath = NULL then
          Update signaturePath;
        else
          if replannedPath = signaturePath then
            Align pose randomly;
            Update signaturePath;
          end
        end
      end
    end
    ACTUATE
    perform movement;
  end
end The above pesudo code 2 is one of an exam plary implementation and such implementation and execution by the system 100 shall not be construed as limiting the scope of the present disclsoure.

When the sensors are non-faulty, the collision avoidance functionality is able to detect and navigate the robot away from the obstacles correctly. In case of partial or completely faulty sensors, there is a probability of collision due to delay in triggering the collision avoidance algorithm (comprised in the memory 102). The obstacle may enter the red zone in such a case, which is equivalent to collision according to definition specified in the present disclosure. Sometimes the vehicle gets trapped at certain configuration in red zone and cannot progress. In such cases, the vehicle needs to randomly change its pose (line 5 of Algorithm 2) to get out of the situation. The dashed line in FIG. 3 approximates the path due to obstacle avoidance maneuver.

Results:

The present disclosure generated an 25 m-sq arena bounded by walls in the Webots simulation framework (e.g., refer "Cyberbotics Ltd., Webots, https://https://www.cyberbotics.com, accessed: 2020-01-13."), in which the robots perform an assigned task. A number of obstacles, with randomly chosen size, are placed randomly in the arena. Each experiment was performed with different robots and sensors as described above. Again, each experiment was performed 10 times and the measurements were averaged for presentation. The simulation results are contrasted with those estimated from the model of the present disclosure, both under error-less and erroneous sensor reading conditions.

Experiment-I: Perfect Sensing

Figure 6:
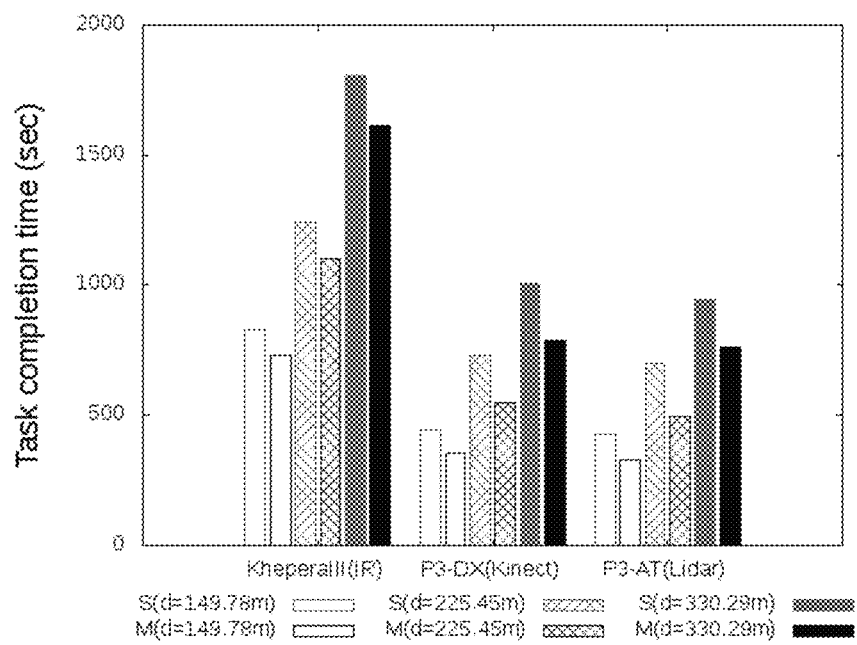
FIG. 6 depicts a graphical representation illustrating model validation under perfect sensing for all the three AGVs, in accordance with an embodiment of the present disclosure.

In the first set of experiments, an attempt was made to validate the model of the present disclosure in a sensor error-free condition. The attached sensors are configured to be perfect. The task completion time in simulated environment has been compared against the same predicted by the model of the present disclosure for various traversal distances, and number and size of obstacles. FIG. 6 compares traversal time for all three types of AGVs. More specifically, FIG. 6, with reference to FIGS. 1 through 5, depicts a graphical representation illustrating model validation under perfect sensing for all the three AGVs, in accordance with an embodiment of the present disclosure. Here S represents simulation results and M represents model results. 20 obstacles of size 0.6 m-cube are randomly placed in the arena in this case. The maximum deviation of simulation result from model is within 10%.

Figure 7:
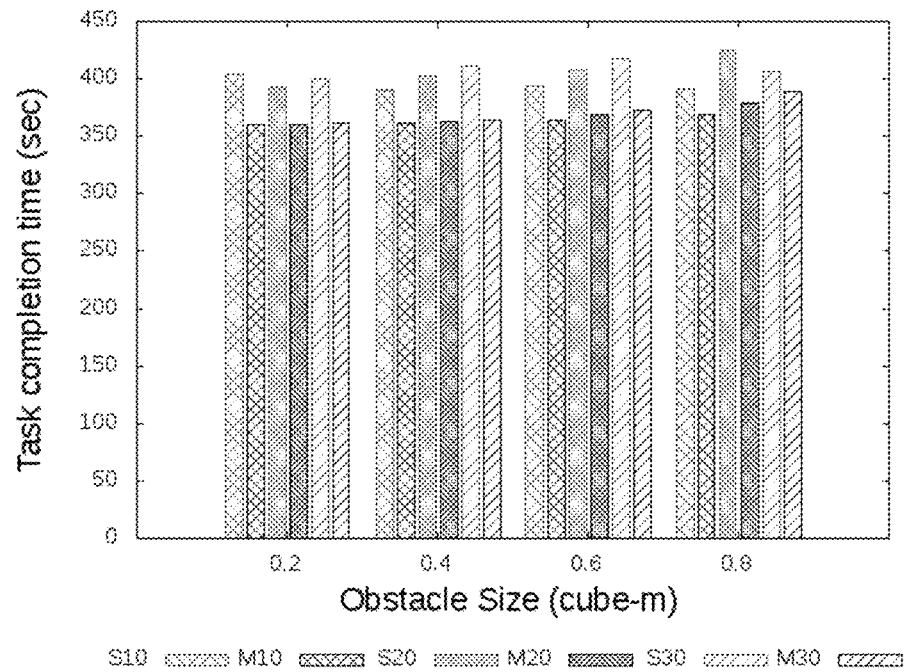
FIG. 7 depicts model validation for varying number and size of obstacles using Kheperra III, in accordance with an embodiment of the present disclosure.

In a similar experiment, the number and size of the obstacles are varied and the comparison for the Khepera-III robot is presented in FIG. 7. FIG. 7 presents the case when the traversal distance is 74.92 m. More specifically, FIG. 7, with reference to FIGS. 1 through 6, depicts model validation for varying number and size of obstacles using Khepera III, in accordance with an embodiment of the present disclosure. S10, S20 and S30 represent simulation results and M10, M20 and M30 represent estimation from model for 10, 20 and 30 obstacles, respectively.

Figure 8:
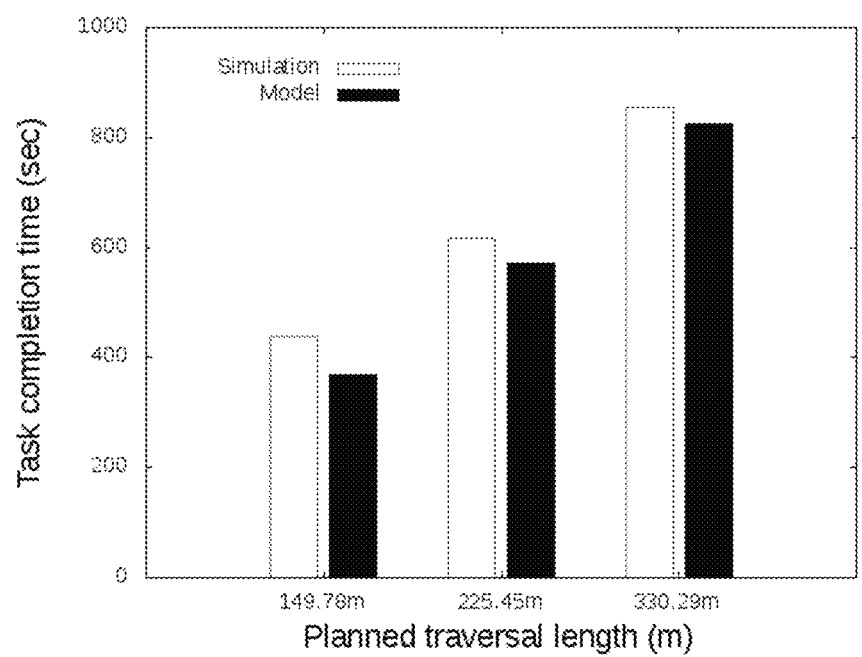
FIG. 8 depicts a graphical representation illustrating model validation for heterogeneous obstacles with Pioneer 3-DX robot for different traversal distances, in accordance with an embodiment of the present disclosure.

The model as described by the present disclosure has been validated in environments consisting of heterogeneous obstacles as well (not shown in FIGS.). The model parameters are determined as follows. The mean obstacle radius, $r_R$, is computed as the radius of the smallest sized obstacle in the arena. The larger obstacles are assumed to be a collection of multiple small sized obstacles and the count of obstacles is the number of such basic obstacles. FIG. 8 compares travel time for various traversal distances while keeping obstacle density constant at 2.15%. More specifically, FIG. 8, with reference to FIGS. 1 through 7, depicts a graphical representation illustrating model validation for heterogeneous obstacles with Pioneer 3-DX robot for different traversal distances, in accordance with an embodiment of the present disclosure. In particular, FIG. 8 represents experiment with the Pioneer 3-DX robot equipped with Kinect sensor. Similar experiments were carried out with other two robots (not discussed herein). Similar trends were observed for these cases and are not shown here.

It is observed that the simulation results closely follow analytical values. The average deviation of simulation values from analytical values is 8%. The result from the other experimental configurations exhibit similar pattern and are not shown here.

Experiment-II: Single Sensor Independent Error

Figure 9A:
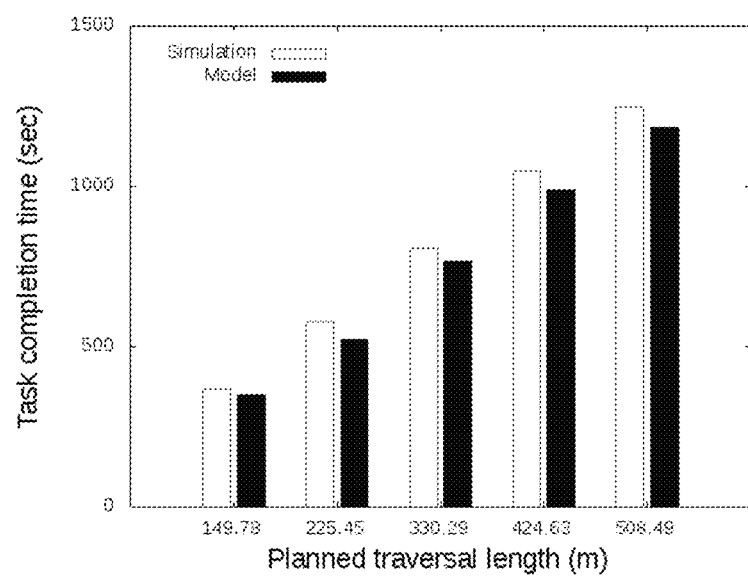
FIGS. 9A and 9B depict graphical representations illustrating model validation under single faulty sensor, with error modeled as N($\mu=0$, $\sigma=1$), in an arena with 20 homogeneous obstacles each of size 0.6 m-cube for various traversal distances, in accordance with an embodiment of the present disclosure.
Figure 9B:
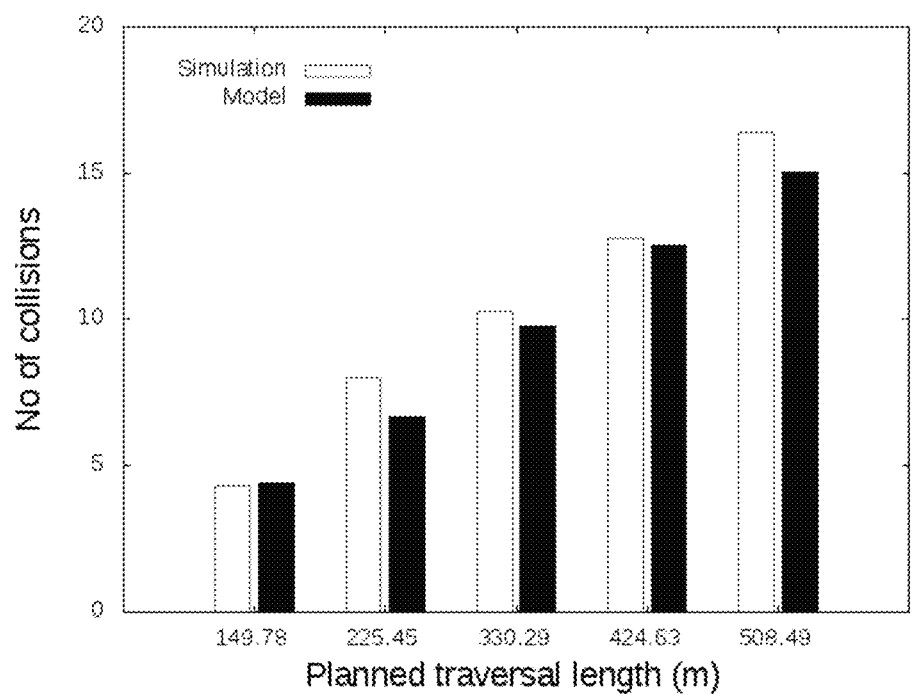

In this set of experiments, sensors are configured to be imperfect, i.e., the sensed values contain error, but the error is independent of those from other sensors. The error in sensor readings is simulated by injecting white Gaussian noise (mean, $\mu$=0). The task completion time and the number of collisions the robot encountered while executing the given traversal task have been observed. Here, the number of collisions is defined as the number of times any obstacle enters the red zone. FIGS. 9A-9B show comparisons using Pioneer 3D-X robot (equipped with Kinect sensor) for various traversal distances. More specifically, FIGS. 9A and 9B, with reference to FIGS. 1 through 8, depict graphical representations illustrating model validation under single faulty sensor, with error modeled as N($\mu$=0, $\sigma$=1), in an arena with 20 homogeneous obstacles each of size 0.6 m-cube for various traversal distances, in accordance with an embodiment of the present disclosure. The simulation results closely follows to the analytical results. Deviation of simulation values from analytical values are within 6%. Similar experiments were conducted with Pioneer 3-AT (using Lidar sensor). The results exhibit similar pattern and are not shown here.

Figure 10A:
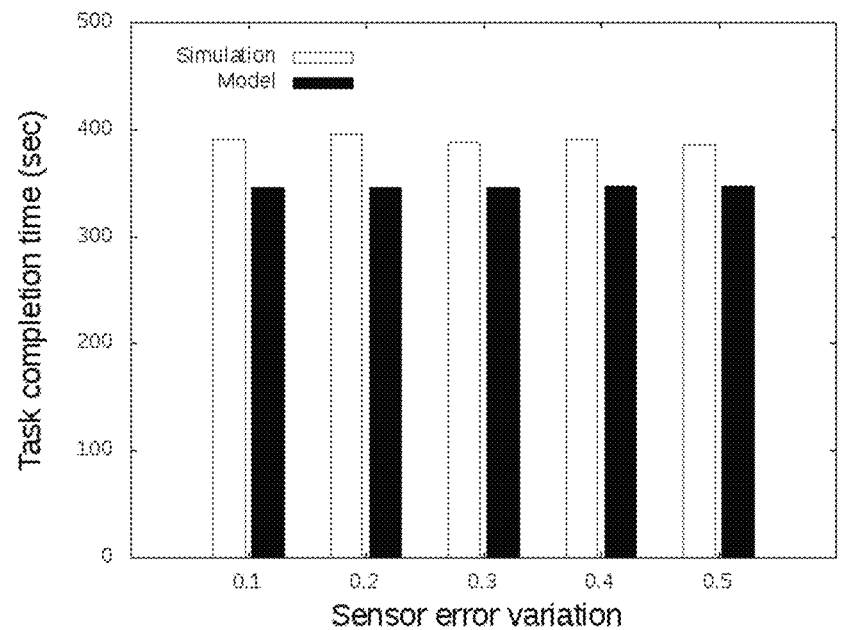
FIGS. 10A and 10B depict graphical representations illustrating model validation under single faulty sensor, with error distribution as N($\mu=0$, $\sigma$), in an arena with 15 homogeneous obstacles each of size 0.4 m-cube, in accordance with an embodiment of the present disclosure.
Figure 10B:
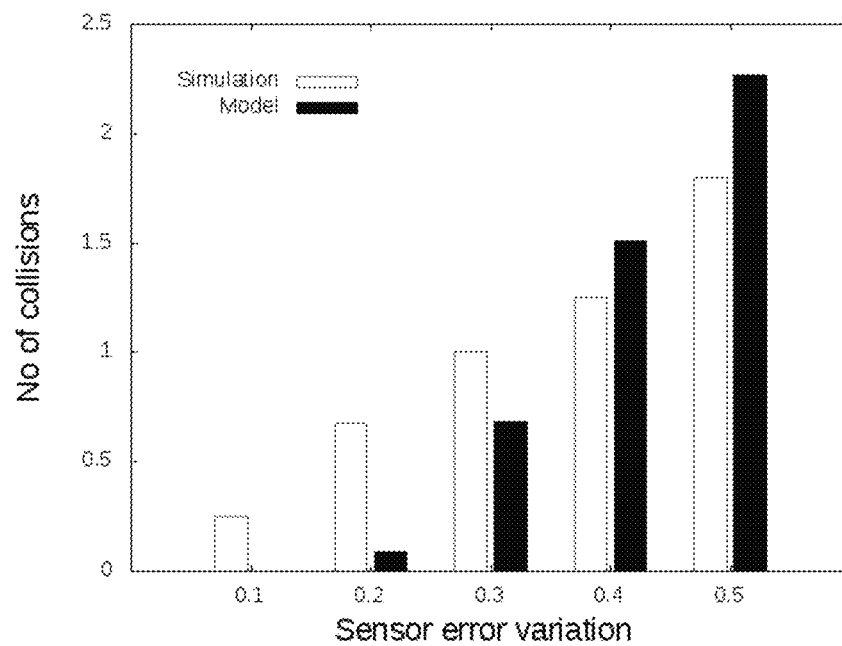

FIGS. 10A and 10B show the effect of increasing error variation in the sensor. More specifically, FIGS. 10A and 10B, with reference to FIGS. 1 through 9B, depict graphical representations illustrating model validation under single faulty sensor, with error distribution as N($\mu$=0, $\sigma$=1), in an arena with 15 homogeneous obstacles each of size 0.4 m-cube, in accordance with an embodiment of the present disclosure. The deviation, $\sigma$, were varied between 0.1 to 0.5. More specifically, in these experiments $\sigma_\epsilon$ is varied between 0.1-0.5. It can be seen that travel time estimation from the model closely matches the simulation values and are within 10% deviation range. The estimation of collision count follows the trend seen from experiments. Grossly, the difference of number of collisions estimated by the model and those actually encountered by the system, in average, does not exceed 0.5, when $\mu_R + \sigma < b_Y$.

Experiment III: Sensor Sensitivity

It is easy to see that when the sensor readings are composed as a linear function, as in this case, $\emptyset(.)$ (the transfer function defined above) is a linear function. The transfer function used in control system in Khepera-III is modeled as a weighted average function of sensor readings, i.e., $\Sigma_{i=0}^{n-1}(w_i r_i)$ such that $\Sigma_{i=0}^{n-1} w_i = 1$. Then, $\emptyset$ is also the same linear weighted function defined as $\emptyset(\vec{\mu}_{\epsilon_i}) = \Sigma_{i=0}^{n-1}(w_i \mu_{\epsilon_i})$. When the sensor composition is defined as weighted average as defined above, the last factor in Equation (7) is:

$$\frac{\partial \emptyset(\vec{\mu}_{\epsilon_i})}{\partial \mu_{\epsilon_i}} = w_i$$

With this sensitivity of the ith sensor stands as follows, $$\frac{\partial E[T]}{\partial \sigma_{\epsilon_i}} = w_i \times \frac{E[T]^2 v \mu_O (\mu_R + r_Y)}{d} \times \frac{\partial Pr(\overline{D_Y} | O_Y)}{\partial \sigma_\epsilon}$$

Since the other factors are constants, this implies that the sensor associated with the highest normalized weight is most sensitive.

Figure 11:
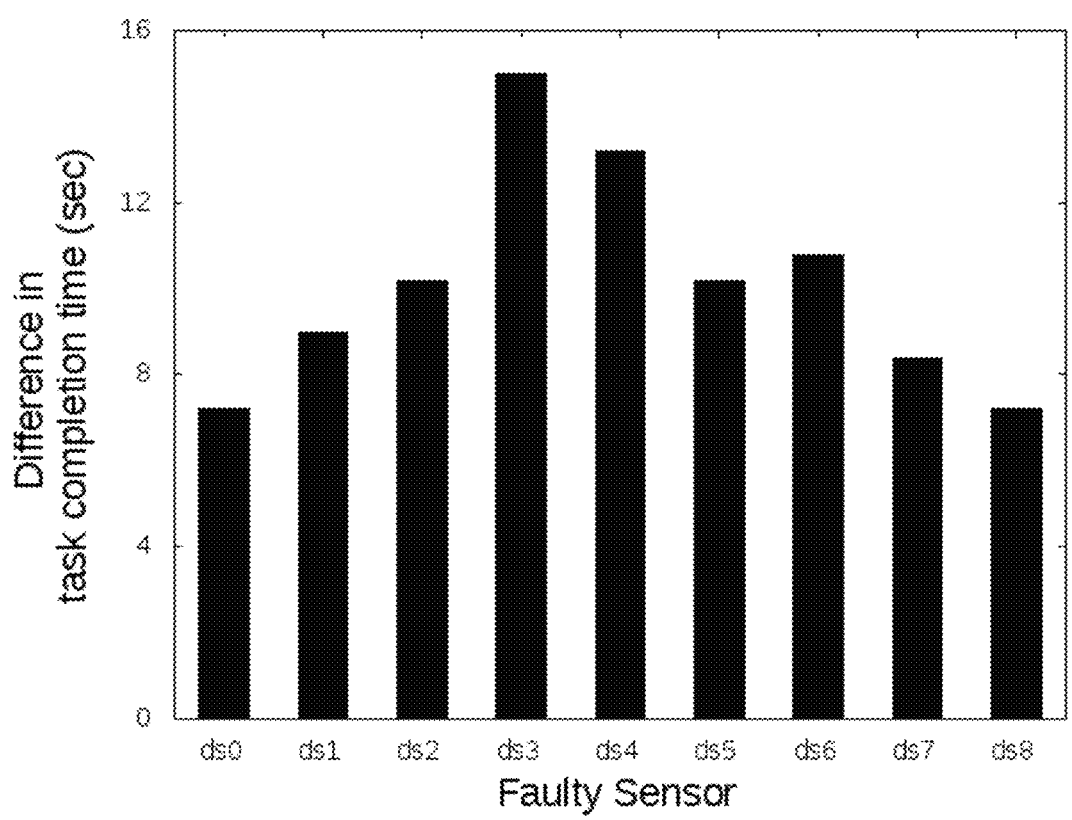
FIG. 11 depicts a graphical representation illustrating sensitivity of sensing on traversal task completion time, in accordance with an embodiment of the present disclosure.

In this experiment the effect on traversal time was studied when one of the proximity sensors of Khepera-III is faulty. In this experiment, the faulty sensor is injected with Gaussian distributed error ($\mu_{\epsilon_i}$=0, $\sigma_{\epsilon_i}$=1). FIG. 11 shows the additional travel time required due to error. More specifically, FIG. 11, with reference to FIGS. 1 through 10B, depicts a graphical representation illustrating sensitivity of sensing on traversal task completion time, in accordance with an embodiment of the present disclosure.

According to the above discussed experimental results, additional task completion times are higher when the front sensors (ds3 and ds4) are faulty. The weights associated with sensors in the model of present disclosure are:

$$\vec{w} = [0.016, 0.1, 0.133, 0.233, 0.216, 0.149, 0.1, 0.016, 0.033]$$

and according to the model ds3 and ds4 carry maximum weight, in order, when the AGV moves forward. Therefore, the experimental result conforms with the sensitivity analysis from the model, and as well as intuition. This also implies that to improve the overall performance of the system, the reliability of these front proximity sensors should be improved.

Experiment-IV: Multi-Sensor Correlated Error

In an AGV system such as Khepera III where values from multiple distance sensors are fused for proximity measurement, errors are often correlated. In this experiment, the present disclosure studied the performance of the system 100 under correlated sensor errors. The mean error of the sensors is co-related and can be treated under the general framework of co-variance computation. The co-variance between their distributions are represented as a co-variance matrix $\mathbb{C} = [\![ p_{ij} ]\!]$. For correlated errors in n sensors, $\mathbb{C}$ is an n×n matrix drawn from [−1, 1], where 1 represents perfect correlation, 0 represents independence, and −1 represents anti-correlation. In this context, for practical purposes, the sensors are not anti-correlated, and hence $p_{ij} \in [0,1]$. For normally distributed co-related errors, mean: $\mu_{68} = \Sigma_i w_i \mu_{\epsilon_i}$ and variance: $\sigma_\epsilon = \Sigma_i w_i^2 \sigma_{\epsilon_i} + 2\Sigma_{i<j}\Sigma_j w_i w_j p_{ij}$ such that $p_{ij}$ is the co-variance of error between the $i^{th}$ and the $j^{th}$ sensors.

In the experiment conducted by the present disclosure, nine proximity sensors situated at the base of the Khepera-III vehicle are injected with correlated errors, computed from a correlation matrix, $\mathbb{C} = [\![ p_{ij} ]\!]$, shown in Table 2.

TABLE 2

| (Correlation Matrix) | | | | | | | | | |
|---|---|---|---|---|---|---|---|---|---|
| | ds0 | ds1 | ds2 | ds3 | ds4 | ds5 | ds6 | ds7 | ds8 |
| ds0 | 1.0 | 0.8 | 0.6 | 0.4 | 0.2 | 0.2 | 0.4 | 0.6 | 0.8 |
| ds1 | 0.8 | 1.0 | 0.8 | 0.6 | 0.4 | 0.2 | 0.2 | 0.4 | 0.6 |
| ds2 | 0.6 | 0.8 | 1.0 | 0.8 | 0.6 | 0.4 | 0.2 | 0.2 | 0.4 |
| ds3 | 0.4 | 0.6 | 0.8 | 1.0 | 0.8 | 0.6 | 0.4 | 0.2 | 0.2 |
| ds4 | 0.2 | 0.4 | 0.6 | 0.8 | 1.0 | 0.8 | 0.6 | 0.4 | 0.2 |

TABLE 2-continued (Correlation Matrix)

|     | ds0 | ds1 | ds2 | ds3 | ds4 | ds5 | ds6 | ds7 | ds8 |
| --- | --- | --- | --- | --- | --- | --- | --- | --- | --- |
| ds5 | 0.2 | 0.2 | 0.4 | 0.6 | 0.8 | 1.0 | 0.8 | 0.6 | 0.4 |
| ds6 | 0.4 | 0.2 | 0.2 | 0.4 | 0.6 | 0.8 | 1.0 | 0.8 | 0.6 |
| ds7 | 0.6 | 0.4 | 0.2 | 0.2 | 0.4 | 0.6 | 0.8 | 1.0 | 0.8 |
| ds8 | 0.8 | 0.6 | 0.4 | 0.2 | 0.2 | 0.4 | 0.6 | 0.8 | 1.0 |

Here $p_{ij}$ represents the correlation coefficient of error among the $i^{th}$ and $j^{th}$ sensors. The diagonal values are always 1 and non-diagonals are between [0, 1]. The rationale behind the design of such a correlation matrix is based on the assumption that a fault in one sensor affects failure in neighboring sensors and the effect dies down with larger separation between the pair. So, the geometry of the sensor positions (FIG. 5) corresponds to such correlation. It is also assumed by the present disclosure that the sensors are all positively correlated with each other. The sensor error vector generated as $E_C$=LE, where the lower triangular matrix L is obtained by Cholesky decomposition such that $\mathbb{C}=LL^T$, and the E=($e_0$, $e_1$, . . . , $e_8$), where $e_i$ represents the independent error value generated for ith sensor. The computed error is then injected to the distance sensors. An example of the correlated failure model is that if sensor reading for ds0 has ϵ amount of error, then ds1 sensor reading is induced by 0.8ϵ amount of error, ds2 by 0.6ϵ, and so on.

Figure 12A:
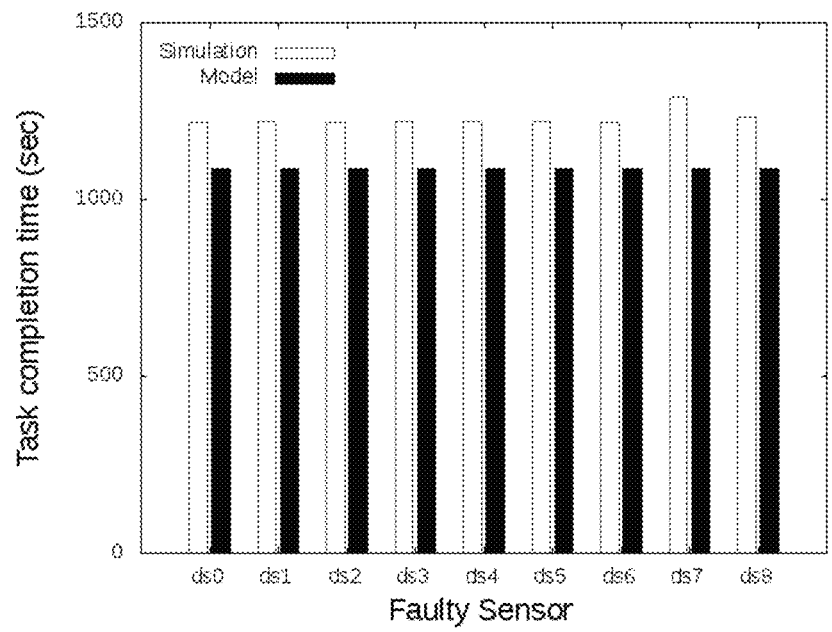
FIGS. 12A and 12B depict a graphical representation illustrating estimation of parameters under multi-sensor correlated error N($\mu=0$, $\sigma=1$), in a 25 m-sq arena having 15 homogeneous obstacles of size 0.4 m-cube, in accordance with an embodiment of the present disclosure.
Figure 12B:
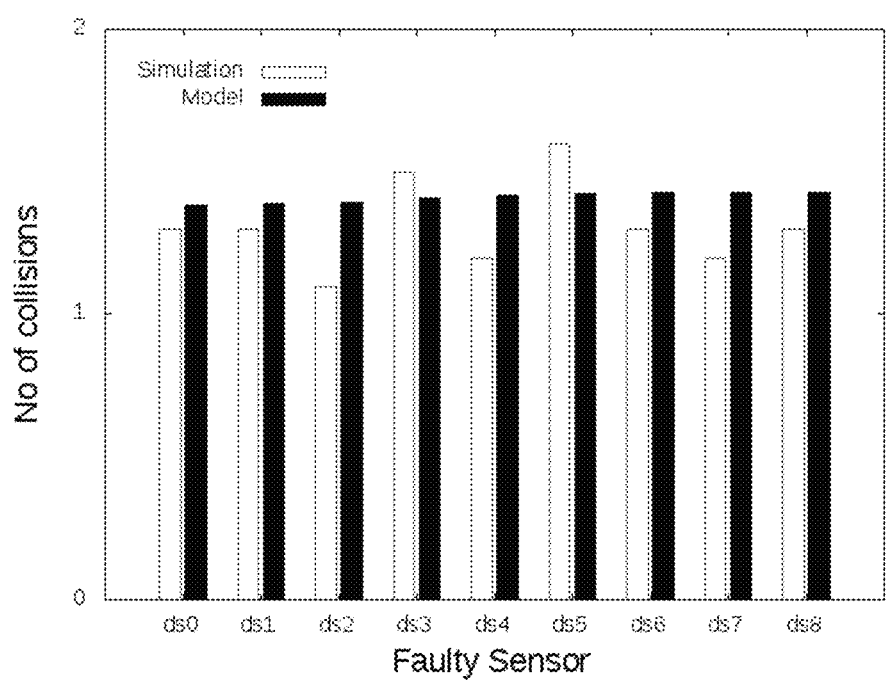

The performance results for correlated error are presented in FIGS. 12A-12B. More specifically, FIGS. 12A and 12B, with reference to FIGS. 1 through 11, depict a graphical representation illustrating estimation of parameters under multi-sensor correlated error N(μ=0, σ=1), in a 25 m-sq arena having 15 homogeneous obstacles of size 0.4 m-cube, in accordance with an embodiment of the present disclosure.

Here the faulty sensor denotes the sensor injected with Gaussian distributed error with $\mu_\epsilon$=0 and $\sigma_\epsilon$=1. The remaining proximity sensors are injected with correlated error as described above. The average deviation of the simulation results from the analytical values is 10%.

Embodiments of the present disclosure implemented a simple traversal model for autonomous ground vehicle (AGV) systems. Through execution of the method, the system 100 of the present disclosure was able to analytically study some important metrics of the system e.g., task completion time, collision count, etc. and its sensitivity to various kinds of errors in the sensors. The system 100 and its model as implemented incorporates sensing errors, both independent and correlated, and computes the effect of such errors on the performance of the system. The system of the present disclosure is also generic enough and can be computed for various obstacle and error models of sensors. Through the experiments conducted by the present disclosure in the Webots simulation system, the present disclosure demonstrated that the system and method/model, although simple, has acceptable accuracy of estimating these performance metrics. Since the model takes a task-level view of the system and is robust enough to handle different types of sensing and actuation systems, as demonstrated by the experiments described herein. On the other hand, sensitivity analysis enables a system designer to identify the most critical components of a given system even before its deployment. Consequently, the reliability of such critical components can be increased at the design time such that the overall system performance, reliability, and safety improves.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   obtaining in a first mode, via one or more hardware processors, an input comprising one or more specifications, wherein the one or more specifications correspond to (a) one or more agents, (b) one or more associated sensors, (c) one or more tasks to be performed by the one or more agents, (d) one or more sensor errors, (e) one or more zones, and (f) one or more environments, wherein the one or more agents comprise at least one of a robot and an autonomous ground vehicle (AGV);
   evaluating in the first mode, via the one or more hardware processors, a distance to be traversed by the one or more agents in the one or more environments, wherein evaluating the distance to be traversed by the one or more agents depends on one or more obstacles encountered by the one or more agents in a planned path to traverse from a source location to a destination location;
   evaluating in the first mode, via the one or more hardware processors, a probability of the one or more associated sensors failing to detect the one or more obstacles by the one or more agents in a specific zone of the one or more zones based on the evaluated distance;
   evaluating in the first mode, via the one or more hardware processors, (i) an expected-time taken to traverse the evaluated distance by the one or more agents depending on the planned path to be traversed and speed of the one or more agents, and (ii) an expected number of encounterable collisions during execution of the one or more tasks based on the probability of failing to detect one or more obstacles by the one or more agents, wherein the expected time taken to traverse is greater than zero, and wherein the expected time taken to traverse increases when the one or more agents triggers an obstacle avoidance maneuver each time any obstacle is detected within the planned path;
   performing in the first mode, via the one or more hardware processors, a first comparison of (i) the evaluated expected time and a pre-defined expected time, (ii) the expected number of encounterable collisions and a pre-defined number of permissible collisions, wherein the pre-defined number of permissible collisions during execution of a given task is an integer value greater than or equal to zero, and wherein the pre-defined number of permissible collisions are application specific and user defined;
   upon determining that the first comparison satisfies an acceptable criteria, deploying the one or more agents in the one or more environments for execution of the one or more tasks, wherein the one or more agents execute the one of more tasks in a second mode, and wherein the first mode and the second mode are distinct from each other, the first mode being an offline mode and the second mode being an online mode;
   upon determining that the first comparison fails to satisfy the acceptable criteria, evaluating sensitivity of each of the one or more associated sensors, via the one or more hardware processors, based on the first comparison, wherein evaluating sensitivity for each of the associated sensors are performed by individually providing each of the one or more associated sensors with Gaussian distributed error and determining a sensitivity value based on performance of each of the one or more associated sensors for the one or more tasks;
   performing a second comparison, via the one or more hardware processors, of the evaluated sensitivity across the one or more associated sensors;
   selecting, via the one or more hardware processors, at least a subset of sensors from the one or more associated sensors based on the second comparison;
   updating, via the one or more hardware processors, one or more corresponding specifications from the one or more specifications based on the selected subset of sensors; and
   continually evaluating in the second mode, during task execution by the one or more agents, via the one or more hardware processors, at least one of (i) remaining distance to be traversed, (ii) remaining expected time taken to traverse, and (iii) remaining expected number of encounterable collisions.

2. The processor implemented method of claim 1, wherein the one or more corresponding specifications correspond to the one or more sensors and the one or more sensor errors.

3. The processor implemented method of claim 1, further comprising, upon updating the one or more corresponding specifications, repeating the step of evaluating in the first mode, via the one or more hardware processors, a probability of failing to detect one or more obstacles by the one or more agents in a specific zone of the one or more zones.

4. The processor implemented method of claim 1, further comprising:
   performing a third comparison of (i) the remaining distance to be traversed and a pre-defined threshold, (ii) the remaining expected time taken to traverse and a pre-defined expected time threshold, and (iii) the remaining expected number of encounterable collisions and a pre-defined number of permissible collisions; and
   enabling the one or more agents to (i) traverse and navigate through an existing planned path or (ii) replan the existing planned path.

5. A system, comprising:
   a memory storing instructions;
   one or more communication interfaces; and
   one or more hardware processors coupled to the memory via the one or more communication interfaces, wherein the one or more hardware processors are configured by the instructions to:
   obtain in a first mode, an input comprising one or more specifications, wherein the one or more specifications correspond to (a) one or more agents, (b) one or more associated sensors, (c) one or more tasks to be performed by the one or more agents, (d) one or more sensor errors, (e) one or more zones, and (f) one or more environments, wherein the one or more agents comprise at least one of a robot and an autonomous ground vehicle (AGV);
evaluate in the first mode, a distance to be traversed by the one or more agents in the one or more environments, wherein evaluating the distance to be traversed by the one or more agents depends on one or more obstacles encountered by the one or more agents in a planned path to traverse from a source location to a destination location;
evaluate in the first mode, a probability of the one or more associated sensors failing to detect the one or more obstacles by the one or more agents in a specific zone of the one or more zones based on the evaluated distance;
evaluate in the first mode, (i) an expected time taken to traverse the evaluated distance by the one or more agents depending on the planned path to be traversed and speed of the one or more agents, and (ii) an expected number of encounterable collisions during execution of the one or more tasks based on the probability of failing to detect one or more obstacles by the one or more agents, wherein the expected time taken to traverse is greater than zero, and wherein the expected time taken to traverse increases when the one or more agents triggers the obstacle avoidance maneuver each time any obstacle is detected within the planned path;
perform in the first mode, a first comparison of (i) the evaluated expected time and a pre-defined expected time, (ii) the expected number of encounterable collisions and a pre-defined number of permissible collisions, wherein the pre-defined number of permissible collisions during execution of a given task is an integer value greater than or equal to zero, and wherein in the pre-defined number of permissible collisions are application specific and user defined;
upon determining that the first comparison satisfies an acceptable criteria, deploying the one or more agents in the one or more environments for execution of the one or more tasks, wherein the one or more agents execute the one of more tasks in a second mode, and wherein the first mode and the second mode are distinct from each other, the first mode being an offline mode and the second mode being an online mode;
upon determining that the first comparison not satisfying an acceptable criteria, evaluate sensitivity of each of the one or more associated sensors based on the first comparison, wherein evaluating sensitivity for each of the associated sensors are performed by individually injecting each of the one or more associated sensors with Gaussian distributed error and determining a sensitivity value based on performance of each of the one or more associated sensors for the one or more tasks;
perform a second comparison of the evaluated sensitivity across the one or more associated sensors;
select at least a subset of sensors from the one or more associated sensors based on the second comparison;
update one or more corresponding specifications from the one or more specifications based on the selected subset of sensors; and
continually evaluate in the second mode, during task execution by the one or more agents, via the one or more hardware processors, at least one of (i) remaining distance to be traversed, (ii) remaining expected time taken to traverse, and (iii) remaining expected number of encounterable collisions.

6. The system of claim 5, wherein the one or more corresponding specifications correspond to the one or more sensors and the one or more sensor errors.

7. The system of claim 5, wherein the one or more hardware processors are further configured to: upon update of the one or more corresponding specifications, repeat the step of evaluating in the first mode, a probability of failing to detect one or more obstacles by the one or more agents in a specific zone of the one or more zones.

8. The system of claim 5, wherein the one or more hardware processors are further configured to:
perform a third comparison of (i) the remaining distance to be traversed and a pre-defined threshold, (ii) the remaining expected time taken to traverse and a pre-defined expected time threshold, and (iii) the remaining expected number of encounterable collisions and a pre-defined number of permissible collisions; and
enable the one or more agents to (i) traverse and navigate through an existing planned path or (ii) replan the existing planned path.

9. One or more non-transitory machine readable information storage mediums comprising one or more instructions which when executed by one or more hardware processors cause a method for imperfect sensing-based analysis of agents deployed in environments for traversal task execution by:
obtaining in a first mode, via the one or more hardware processors, an input comprising one or more specifications, wherein the one or more specifications correspond to (a) one or more agents, (b) one or more associated sensors, (c) one or more tasks to be performed by the one or more agents, (d) one or more sensor errors, (e) one or more zones, and (f) one or more environments, wherein the one or more agents comprise at least one of a robot and an autonomous ground vehicle (AGV);
evaluating in the first mode, via the one or more hardware processors, a distance to be traversed by the one or more agents in the one or more environments, wherein evaluating the distance to be traversed by the one or more agents depends on one or more obstacles encountered by the one or more agents in a planned path to traverse from a source location to a destination location;
evaluating in the first mode, via the one or more hardware processors, a probability of the one or more associated sensors failing to detect the one or more obstacles by the one or more agents in a specific zone of the one or more zones based on the evaluated distance;
evaluating in the first mode, via the one or more hardware processors, (i) an expected time taken to traverse the evaluated distance by the one or more agents depending on the path to be traversed and speed of the one or more agents, and (ii) an expected number of encounterable collisions during execution of the one or more tasks based on the probability of failing to detect one or more obstacles by the one or more agents, wherein the expected time taken to traverse is greater than zero, and wherein the expected time taken to traverse increases when the one or more agents triggers an obstacle avoidance maneuver each time any obstacle is detected within the planned path;
performing in the first mode, via the one or more hardware processors, a first comparison of (i) the evaluated expected time and a pre-defined expected time, (ii) the expected number of encounterable collisions and a pre-defined number of permissible collisions, wherein the pre-defined number of permissible collisions during execution of a given task is an integer value greater than or equal to zero, and wherein the pre-defined number of permissible collisions are application specific and user defined;

upon determining that the first comparison satisfies an acceptable criteria, deploying the one or more agents in the one or more environments for execution of the one or more tasks, wherein the one or more agents execute the one of more tasks in a second mode, and wherein the first mode and the second mode are distinct from each other, the first mode being an offline mode and the second mode being an online mode;

upon determining that the first comparison not satisfying an acceptable criteria, evaluating sensitivity of each of the one or more associated sensors based on the first comparison, wherein evaluating sensitivity for each of the associated sensors are performed by individually injecting each of the one or more associated sensors with Gaussian distributed error and determining a sensitivity value based on performance of each of the one or more associated sensors for the one or more tasks;

performing a second comparison of the evaluated sensitivity across the one or more associated sensors;

selecting at least a subset of sensors from the one or more associated sensors based on the second comparison;

updating one or more corresponding specifications from the one or more specifications based on the selected subset of sensors; and continually evaluating in the second mode, during task execution by the one or more agents, via the one or more hardware processors, at least one of (i) remaining distance to be traversed, (ii) remaining expected time taken to traverse, and (iii) remaining expected number of encounterable collisions.

10. The one or more non-transitory machine readable information storage mediums of claim 9, wherein the one or more instructions which when executed by the one or more hardware processors causes:

upon updating the one or more corresponding specifications, repeating the step of evaluating in the first mode, via the one or more hardware processors, a probability of failing to detect one or more obstacles by the one or more agents in a specific zone of the one or more zones.

11. The one or more non-transitory machine readable information storage mediums of claim 10, wherein the one or more corresponding specifications correspond to the one or more sensors and the one or more sensor errors.

12. The one or more non-transitory machine readable information storage mediums of claim 10, wherein the one or more instructions which when executed by the one or more hardware processors causes:

performing a third comparison of (i) the remaining distance to be traversed and a pre-defined threshold, (ii) the remaining expected time taken to traverse and a pre-defined expected time threshold, and (iii) the remaining expected number of encounterable collisions and a pre-defined number of permissible collisions; and enabling the one or more agents to (i) traverse and navigate through an existing planned path or (ii) replan the existing planned path.

\* \* \* \* \*